(12) United States Patent
Shellhammer et al.

(10) Patent No.: US 10,484,228 B2
(45) Date of Patent: Nov. 19, 2019

(54) WAKEUP RADIO TRANSMIT DIVERSITY

(71) Applicant: QUALCOMM Incorporated, San Diego, CA (US)

(72) Inventors: Stephen Jay Shellhammer, Ramona, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/272,643

(22) Filed: Feb. 11, 2019

(65) Prior Publication Data

US 2019/0273647 A1      Sep. 5, 2019

Related U.S. Application Data

(60) Provisional application No. 62/638,922, filed on Mar. 5, 2018.

(51) Int. Cl.
*H04L 27/26* (2006.01)
*H04L 27/233* (2006.01)
*H04W 52/02* (2009.01)
*H04L 27/20* (2006.01)

(52) U.S. Cl.
CPC ...... *H04L 27/2686* (2013.01); *H04L 27/2082* (2013.01); *H04L 27/2331* (2013.01); *H04L 27/261* (2013.01); *H04L 27/2607* (2013.01); *H04L 27/2657* (2013.01); *H04W 52/0216* (2013.01)

(58) Field of Classification Search
CPC ............. H04L 27/2082; H04L 27/2331; H04L 27/2607; H04L 27/261; H04L 27/2657; H04L 27/2686; H04L 27/2602; H04L 27/2618; H04L 27/2627; H04W 52/0216; H04W 52/0229; H04W 52/0235; H04W 52/0274
See application file for complete search history.

(56) References Cited

U.S. PATENT DOCUMENTS

| | | | |
|---|---|---|---|
| 10,129,064 B1* | 11/2018 | Lee | H04L 27/2627 |
| 2016/0099764 A1 | 4/2016 | Yang et al. | |
| 2018/0270756 A1* | 9/2018 | Bhattad | H04W 52/0225 |
| 2019/0090193 A1* | 3/2019 | Liu | H04W 52/028 |
| 2019/0103950 A1* | 4/2019 | Liu | H04W 76/28 |

(Continued)

OTHER PUBLICATIONS

International Search Report and Written Opinion —PCT/US20191017573—ISA/EPO—May 3, 2019.

(Continued)

*Primary Examiner* — David B Lugo
(74) *Attorney, Agent, or Firm* — Holland & Hart LLP

(57) ABSTRACT

Methods, systems, and devices for wireless communication are described. A transmitting device may transmit a wakeup message to another device. The wakeup message may be transmitted using a transmit diversity scheme in accordance with aspects of the present disclosure. The transmit diversity may, for example, include a cyclic shift diversity scheme, a phase rotation scheme, a symbol generation scheme, or combinations thereof. The transmit diversity may in some cases improve a communication range of the wakeup message or otherwise benefit the wireless communications system.

28 Claims, 13 Drawing Sheets

(56) References Cited

U.S. PATENT DOCUMENTS

2019/0174413 A1* 6/2019 Huang .............. H04W 52/0229

OTHER PUBLICATIONS

LAN/MAN Standard Committee of the IEEE Computer Society: "Draft Standard for Information Technology-Tele-Communications and Information Exchange between Systems Local and Metropolitan Area Networks-Specific Requirements, Part 11: Wireless LAN Medium Access Control (MAC) and Physical Layer (PHY) Specifications, Amendment 9: Wake-Up Radio Operation", IEEE Draft; Draft P802.11 BA D0.1, IEEE-SA, Piscataway, NJ USA, vol. 802.11ba Drafts, No. D0.1, Feb. 6, 2018 (Feb. 6, 2018), pp. 1-54, XP068137632, Retrieved from the Internet: URL: http://www.ieee802.org/11/private/Draft_Standards/11ba/DraftP802.11ba_D0.1,pdf [retrieved on Feb. 6, 2018], p. 39-p. 53.

Shellhammer S (Qualcomm): "Multiantenna TX Diversity", IEEE Draft; 11-18-0773-00-00BA-Multiantenna-TX-Diversity, IEEE-SA Mentor, Piscataway, NJ USA, vol. 802.11ba, May 7, 2018 (May 7, 2018), pp. 1-23, XP068125900, Retrieved from the Internet: URL: https://mentor.ieee.org/802.11/dcn/18/11-18-0773-00-00ba-multiantenna-tx-diversity.pptx [retrieved on May 7, 2018].

Wilhelmsson L (Ericsson): "Meeting Minutes January 2018", IEEE Draft; 11-18-0270-00-00BA-Meeting-Minutes-January-2018, IEEE-SA Mentor, Piscataway, NJ USA, vol. 802.11ba, Jan. 25, 2018 (Jan. 25, 2018), pp. 1-23, XP068123068, Retrieved from the Internet: URL: https://mentor.ieee.org/802.11/dcn/18/11-18-0270-00-00ba-meeting-minutes-january-2018.docx [retrieved on Jan. 25, 2018], p. 1-p. 5.

* cited by examiner

WAKEUP RADIO TRANSMIT DIVERSITY

CROSS REFERENCES

The present Application for Patent claims the benefit of U.S. Provisional Patent Application No. 62/638,922 by Shellhammer, et al., entitled "Wakeup Radio Transmit Diversity," filed Mar. 5, 2018, assigned to the assignee hereof, and expressly incorporated by reference herein.

BACKGROUND

The following relates generally to wireless communication, and more specifically to wakeup radio (WUR) transmit diversity.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) or uplink (UL). The DL (or forward link) may refer to the communication link from the AP to the STA, and the UL (or reverse link) may refer to the communication link from the STA to the AP.

A wireless device (e.g., a STA) may have a limited amount of available battery power. In some cases (e.g., during a sleep or low-power mode), the wireless device may periodically (or aperiodically) activate a radio, such as a WLAN transceiver, to communicate with an AP. In some cases, the wireless device may use a low-power receiver or WUR to listen for and decode a wakeup message from an AP. The wakeup message may, for example, indicate a presence of communications to be transmitted to the wireless device. Thus, the wireless device may in some cases activate its primary radio (e.g., a WLAN transceiver) based on receiving the wakeup message at the WUR. In some cases, the WUR may be unable to efficiently receive the wakeup message or may otherwise not be able to decode the wakeup message successfully. For example, the wireless device may be located outside of a range of the device transmitting the wakeup message. Improved techniques for wakeup messaging may be desired.

SUMMARY

The described techniques relate to improved methods, systems, devices, or apparatuses that support wakeup radio (WUR) transmit diversity. A transmitting wireless device, for example an access point (AP), may transmit a wakeup message to a WUR of a wireless device (e.g., a station (STA)). In some cases, the WUR may be an example of a low power receiver (a receiver with fewer and/or less complex receive chain components). For example, the WUR may have limited noise cancellation properties, limited phase rotation processing capabilities, or the like. In some cases, the wakeup signal may be designed in consideration of such limitations. For example, the wakeup signal may include a narrowband portion of a frequency spectrum, a low data rate portion, a Manchester coding scheme, and may use on/off keying (OOK) modulation or the like.

In some cases, the properties of the wakeup signal and/or WUR may result in a limited communication range (e.g., compared to the range associated with a primary radio, such as a WLAN or Wi-Fi radio, of the STA). Techniques for addressing a limited communication range (and similar issues related to the wakeup signal such as noise cancellation, interference management, etc.) are discussed herein. By way of example, such techniques may include the use of multiple antennas for a transmission. Such techniques may also include a transmit diversity scheme, such as a cyclic diversity scheme. In some cases, the cyclic diversity scheme may include or be referred to as a cyclic shift diversity (CSD) or cyclic delay diversity (CDD) scheme, which may generate diversity among a plurality of antennas by applying different relative cyclic shifts to symbols or waveforms of the respective version of the wakeup signal transmitted from each different antenna. For example, different length cyclic delays (which may also be referred to as a cyclic shift, cyclic delay value, cyclic shift value, or CSD value) may be applied to different portions of each version of the wakeup signal in accordance with aspects of the following. Additionally or alternatively, the transmit diversity scheme may include the transmission of different signals from each of a plurality of antennas of the AP. For example, each antenna may transmit a different respective orthogonal frequency division multiplexing (OFDM) symbol (e.g., which may be selected to minimize the variance of a combined transmit power across the plurality of antennas). Additionally or alternatively, the transmit diversity scheme may include different phase rotations applied to symbols of the wakeup signal for the different antennas in accordance with aspects of the following.

A method of wireless communication is described. The method may include identifying, for a first portion of a wakeup radio frame, a first set of cyclic delay values corresponding to a plurality of antennas of the first wireless device, identifying, for a second portion of the wakeup radio frame, a second set of cyclic delay values corresponding to the plurality of antennas, applying the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas, and transmitting the cyclically-shifted wakeup signals to a second wireless device using the plurality of antennas.

An apparatus for wireless communication is described. The apparatus may include means for identifying, for a first portion of a wakeup radio frame, a first set of cyclic delay values corresponding to a plurality of antennas of the first wireless device, means for identifying, for a second portion of the wakeup radio frame, a second set of cyclic delay values corresponding to the plurality of antennas, means for applying the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas, and means for transmitting the cyclically-shifted wakeup signals to a second wireless device using the plurality of antennas.

Another apparatus for wireless communication is described. The apparatus may include a processor, memory in electronic communication with the processor, and instructions stored in the memory. The instructions may be operable to cause the processor to identify, for a first portion of a wakeup radio frame, a first set of cyclic delay values corresponding to a plurality of antennas of the first wireless device, identify, for a second portion of the wakeup radio frame, a second set of cyclic delay values corresponding to the plurality of antennas, apply the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas, and transmit the cyclically-shifted wakeup signals to a second wireless device using the plurality of antennas.

A non-transitory computer-readable medium for wireless communication is described. The non-transitory computer-readable medium may include instructions operable to cause a processor to identify, for a first portion of a wakeup radio frame, a first set of cyclic delay values corresponding to a plurality of antennas of the first wireless device, identify, for a second portion of the wakeup radio frame, a second set of cyclic delay values corresponding to the plurality of antennas, apply the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas, and transmit the cyclically-shifted wakeup signals to a second wireless device using the plurality of antennas.

In some examples of the method, apparatus, and non-transitory computer-readable medium described above, identifying the first set of cyclic delay values comprises identifying the first set of cyclic delay values based at least in part on a first bandwidth for the first portion of the wakeup radio frame. In some examples of the method, apparatus, and non-transitory computer-readable medium described above, identifying the second set of cyclic delay values comprises identifying the second set of cyclic delay values based at least in part on a second bandwidth for the second portion of the wakeup radio frame.

In some examples of the method, apparatus, and non-transitory computer-readable medium described above, the first bandwidth may be larger than the second bandwidth. In some examples of the method, apparatus, and non-transitory computer-readable medium described above, cyclic delay values of the first set of cyclic delay values corresponding to the plurality of antennas may be equal to or less than cyclic delay values of the second set of cyclic delay values corresponding to the plurality of antennas.

In some examples of the method, apparatus, and non-transitory computer-readable medium described above, identifying the first set of cyclic delay values comprises identifying the first set of cyclic delay values based at least in part on a first data rate for the first portion of the wakeup radio frame. In some examples of the method, apparatus, and non-transitory computer-readable medium described above, identifying the second set of cyclic delay values comprises identifying the second set of cyclic delay values based at least in part on a second data rate for the second portion of the wakeup radio frame.

In some examples of the method, apparatus, and non-transitory computer-readable medium described above, the first data rate may be greater than the second data rate. Some examples of the method, apparatus, and non-transitory computer-readable medium described above may further include that cyclic delay values of the first set of cyclic delay values corresponding to the plurality of antennas may be equal to or greater than cyclic delay values of the second set of cyclic delay values corresponding to the plurality of antennas.

In some examples of the method, apparatus, and non-transitory computer-readable medium described above, the first portion of the wakeup radio frame comprises at least a synchronization field of the wakeup radio frame. In some examples of the method, apparatus, and non-transitory computer-readable medium described above, the second portion of the wakeup radio frame comprises at least a data field of the wakeup radio frame.

In some examples of the method, apparatus, and non-transitory computer-readable medium described above, applying the second set of cyclic delay values to the second portion of the wakeup radio frame comprises generating a plurality of OFDM symbols comprising the second portion. Some examples of the method, apparatus, and non-transitory computer-readable medium described above may further include processes, features, means, or instructions for applying the second set of cyclic delay values to at least a portion of each of the plurality of OFDM symbols.

In some examples of the method, apparatus, and non-transitory computer-readable medium described above, applying the second set of cyclic delay values to the second portion of the wakeup radio frame comprises generating a plurality of OFDM symbols comprising the second portion. Some examples of the method, apparatus, and non-transitory computer-readable medium described above may further include processes, features, means, or instructions for generating an OFDM waveform for a duration of the second portion of the wakeup radio frame based at least in part on the generated plurality of OFDM symbols. Some examples of the method, apparatus, and non-transitory computer-readable medium described above may further include processes, features, means, or instructions for applying the second set of cyclic delay values to the OFDM waveform for the plurality of antennas to generate a cyclically-shifted OFDM waveform. Some examples of the method, apparatus, and non-transitory computer-readable medium described above may further include processes, features, means, or instructions for modulating to the cyclically-shifted OFDM waveform using on-off keying.

In some examples of the method, apparatus, and non-transitory computer-readable medium described above, the wakeup radio frame comprises a legacy short training field (L-STF), a legacy long training field (L-LTF), a legacy signal field (L-SIG), and a binary phase shift keying (BPSK)-Mark field having a first bandwidth. In some examples of the method, apparatus, and non-transitory computer-readable medium described above, a synchronization field and a data field may have a second bandwidth smaller than the first bandwidth. In some examples of the method, apparatus, and non-transitory computer-readable medium described above, a cyclic delay value associated with the synchronization field and a cyclic delay value associated with the data field are equal to each other. In some examples of the method, apparatus, and non-transitory computer-readable medium described above, a cyclic delay value associated with the synchronization field and a cyclic delay value associated with the data field are different from each other.

A method of wireless communication is described. The method may include identifying a plurality of antennas to be used to transmit a wakeup radio frame to a second wireless device, generating, for at least a portion of the wakeup radio frame, a first set of OFDM symbols to be transmitted using a first antenna of the plurality of antennas, and a second set of OFDM symbols to be transmitted using a second antenna of the plurality of antennas, modulating the first set of OFDM symbols using on-off keying to generate a first modulated wakeup signal for the first antenna, modulating the second set of OFDM symbols using the on-off keying to generate a second modulated wakeup signal for the second antenna, and transmitting the first modulated wakeup signal using the first antenna and the second modulated wakeup signal using the second antenna.

An apparatus for wireless communication is described. The apparatus may include means for identifying a plurality of antennas to be used to transmit a wakeup radio frame to a second wireless device, means for generating, for at least a portion of the wakeup radio frame, a first set of OFDM symbols to be transmitted using a first antenna of the plurality of antennas, and a second set of OFDM symbols to be transmitted using a second antenna of the plurality of antennas, means for modulating the first set of OFDM symbols using on-off keying to generate a first modulated wakeup signal for the first antenna, means for modulating the second set of OFDM symbols using the on-off keying to generate a second modulated wakeup signal for the second antenna, and means for transmitting the first modulated wakeup signal using the first antenna and the second modulated wakeup signal using the second antenna.

Another apparatus for wireless communication is described. The apparatus may include a processor, memory in electronic communication with the processor, and instructions stored in the memory. The instructions may be operable to cause the processor to identify a plurality of antennas to be used to transmit a wakeup radio frame to a second wireless device, generate, for at least a portion of the wakeup radio frame, a first set of OFDM symbols to be transmitted using a first antenna of the plurality of antennas, and a second set of OFDM symbols to be transmitted using a second antenna of the plurality of antennas, modulate the first set of OFDM symbols using on-off keying to generate a first modulated wakeup signal for the first antenna, modulate the second set of OFDM symbols using the on-off keying to generate a second modulated wakeup signal for the second antenna, and transmit the first modulated wakeup signal using the first antenna and the second modulated wakeup signal using the second antenna.

A non-transitory computer-readable medium for wireless communication is described. The non-transitory computer-readable medium may include instructions operable to cause a processor to identify a plurality of antennas to be used to transmit a wakeup radio frame to a second wireless device, generate, for at least a portion of the wakeup radio frame, a first set of OFDM symbols to be transmitted using a first antenna of the plurality of antennas, and a second set of OFDM symbols to be transmitted using a second antenna of the plurality of antennas, modulate the first set of OFDM symbols using on-off keying to generate a first modulated wakeup signal for the first antenna, modulate the second set of OFDM symbols using the on-off keying to generate a second modulated wakeup signal for the second antenna, and transmit the first modulated wakeup signal using the first antenna and the second modulated wakeup signal using the second antenna.

In some examples of the method, apparatus, and non-transitory computer-readable medium described above, at least one of the first set of OFDM symbols may be different from a corresponding at least one of the second set of OFDM symbols.

In some examples of the method, apparatus, and non-transitory computer-readable medium described above, generating the first set of OFDM symbols and the second set of OFDM symbols, comprises selecting a set of values used to generate the first set of OFDM symbols, or the second set of OFDM symbols, or a combination thereof, based at least in part on an aggregated transmit power metric.

In some examples of the method, apparatus, and non-transitory computer-readable medium described above, the selected set of values minimize a variance of the aggregated transmit power metric across the plurality of antennas.

A method of wireless communication is described. The method may include identifying a plurality of antennas to be used to transmit a wakeup radio frame to a second wireless device, generating, for at least a portion of the wakeup radio frame, a set of OFDM symbols to be transmitted by the plurality of antennas, dividing each of the OFDM symbols of the set of OFDM symbols into a plurality of segments, applying, for each of the plurality of antennas, a different set of phase rotations to the plurality of segments to generate a plurality of phase-rotated wakeup signals corresponding to the wakeup radio frame, and transmitting the plurality of phase-rotated wakeup signals using the plurality of antennas.

An apparatus for wireless communication is described. The apparatus may include means for identifying a plurality of antennas to be used to transmit a wakeup radio frame to a second wireless device, means for generating, for at least a portion of the wakeup radio frame, a set of OFDM symbols to be transmitted by the plurality of antennas, means for dividing each of the OFDM symbols of the set of OFDM symbols into a plurality of segments, means for applying, for each of the plurality of antennas, a different set of phase rotations to the plurality of segments to generate a plurality of phase-rotated wakeup signals corresponding to the wakeup radio frame, and means for transmitting the plurality of phase-rotated wakeup signals using the plurality of antennas.

Another apparatus for wireless communication is described. The apparatus may include a processor, memory in electronic communication with the processor, and instructions stored in the memory. The instructions may be operable to cause the processor to identify a plurality of antennas to be used to transmit a wakeup radio frame to a second wireless device, generate, for at least a portion of the wakeup radio frame, a set of OFDM symbols to be transmitted by the plurality of antennas, divide each of the OFDM symbols of the set of OFDM symbols into a plurality of segments, apply, for each of the plurality of antennas, a different set of phase rotations to the plurality of segments to generate a plurality of phase-rotated wakeup signals corresponding to the wakeup radio frame, and transmit the plurality of phase-rotated wakeup signals using the plurality of antennas.

A non-transitory computer-readable medium for wireless communication is described. The non-transitory computer-readable medium may include instructions operable to cause a processor to identify a plurality of antennas to be used to transmit a wakeup radio frame to a second wireless device, generate, for at least a portion of the wakeup radio frame, a set of OFDM symbols to be transmitted by the plurality of antennas, divide each of the OFDM symbols of the set of OFDM symbols into a plurality of segments, apply, for each of the plurality of antennas, a different set of phase rotations to the plurality of segments to generate a plurality of phase-rotated wakeup signals corresponding to the wakeup radio frame, and transmit the plurality of phase-rotated wakeup signals using the plurality of antennas.

DETAILED DESCRIPTION

Aspects of the disclosure are initially described in the context of a wireless communications system, such as wireless local area network (WLAN). To conserve power, some wireless devices may include a primary radio for communicating data during an active state and a wakeup radio (WUR) (e.g., a low-power radio such as a super regenerative receiver (SRR)) to receive communications during a low-power state. In order to receive communications during the low-power state, the wireless device may periodically (e.g., based on some duty cycle) activate the WUR and listen for a wakeup message from an AP indicating that communications are waiting to be transmitted to the wireless device. As part of the power conservation, communications associated with the low-power radio may be transmitted at a lower data rate (e.g., using on/off keying (OOK) modulation, and specifically in some examples multi-carrier OOK (MC-OOK) modulation), than communications associated with the primary radio. For example, the lower data rate may be based at least in part on the modulation scheme and/or the use of fewer carriers of a multicarrier channel than used by the primary radio. Due to a variety of factors (e.g., path loss, interference, etc.), the WUR may be unable to decode some wakeup messages transmitted by the AP.

In accordance with aspects of the following, the AP (e.g., which may be used herein to refer to the transmitting device, though it is to be understood that in some times the transmitting device may be another wireless device such as a STA, an Internet-of-Things (IoT) device, or the like) may transmit different waveforms over each of a plurality of antennas such that the different waveforms may in some cases constructively combine at the WUR due to the different phase rotations experienced by the respective waveforms over the medium. By way of example, such techniques may include a transmit diversity scheme (e.g., using a cyclic diversity scheme). In some cases, the cyclic diversity scheme may include or be referred to as a cyclic shift diversity (CSD) or cyclic delay diversity (CDD) scheme. Additionally or alternatively, the transmit diversity scheme may include the transmission of different signals (e.g., different symbols, different phase-rotated versions of the same symbol, etc.) from each of a plurality of antennas of the AP. Such transmit diversity schemes may reduce or minimize the effects of destructive interference of the multiple signals at the receiver of a wireless device, which may increase the effective range and signal quality of a wakeup message.

Aspects of the disclosure are initially described in the context of a WLAN. Aspects of the disclosure are then illustrated by and described with reference to transmit schemes and encoding schemes. Aspects of the disclosure are further illustrated by and described with reference to apparatus diagrams, system diagrams, and flowcharts that relate to wakeup radio transmit diversity.

Figure 1:
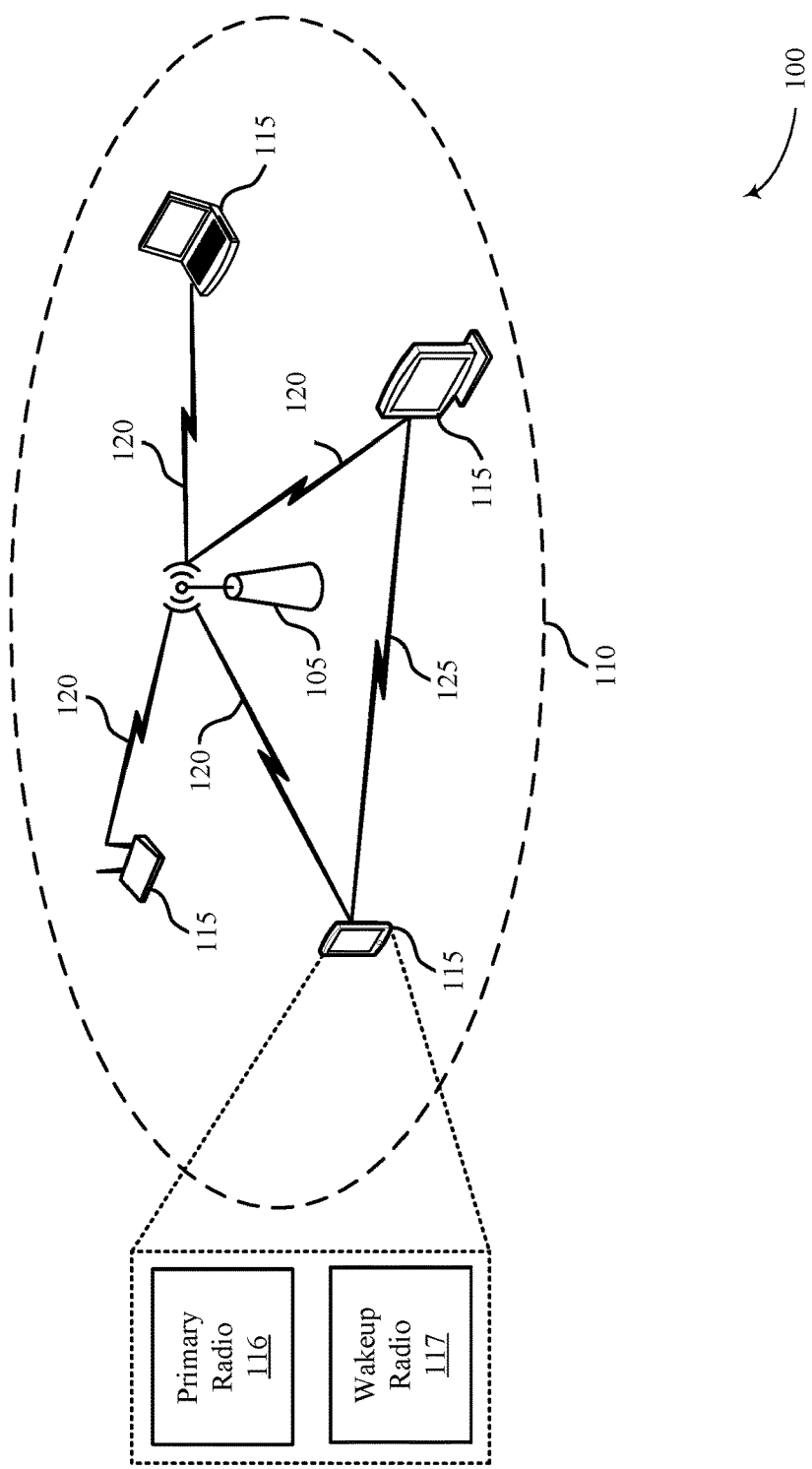
FIG. 1 illustrates an example of a WLAN that supports wakeup radio transmit diversity in accordance with aspects of the present disclosure.

FIG. 1 illustrates a WLAN 100 (also known as a Wi-Fi network) configured in accordance with various aspects of the present disclosure. The WLAN 100 may include an AP 105 and multiple associated STAs 115, which may represent devices such as wireless communication terminals, including mobile stations, phones, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

In some examples, a STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11ay, 802.11az, 802.11ba, etc. In other implementations, peer-to-peer connections or ad hoc networks may be implemented within WLAN 100.

Devices in WLAN 100 may communicate over unlicensed spectrum, which may be a portion of spectrum that includes frequency bands traditionally used by Wi-Fi technology, such as the 5 GHz band, the 2.4 GHz band, the 60

GHz band, the 3.6 GHz band, and/or the 900 MHz band. The unlicensed spectrum may also include other frequency bands. Devices in WLAN 100 may additionally or alternatively communicate over shared licensed spectrum.

In some examples, a STA 115 may include multiple radios such as a lower power radio (for power saving) and a higher power radio (for high throughput communication). The higher power radio (e.g., primary radio 116) may be used during active modes or for high-data throughput applications. The primary radio 116 may also be referred to as a primary connectivity radio, main radio, Wi-Fi or WLAN radio, or the like. The low-power wakeup radio 117 may be used during low-power modes or for low-throughput applications. In some examples, the wakeup radio 117 may include a wakeup receiver and/or a wakeup transmitter. The wakeup radio 117 may also be referred to as a companion radio, low-power companion radio, low power wakeup radio, etc.

Wakeup radio 117 may utilize a different modulation scheme than primary radio 116. Modulation is the process of representing a digital signal by modifying the properties of a periodic waveform (e.g., frequency, amplitude, and phase). Demodulation reverses the process (e.g., generates a digital signal from a received waveform). A modulated waveform may be divided into time units known as symbols. Each symbol may be modulated separately. In a wireless communication system that uses narrow frequency subcarriers to transmit distinct symbols, the modulation may be accomplished by varying the phase and amplitude of each symbol. For example, a binary phase shift keying (BPSK) modulation scheme conveys information by alternating between waveforms that are transmitted with no phase offset or with a 180° offset (i.e., each symbol conveys a single bit of information). In a quadrature amplitude modulation (QAM) scheme, two carrier signals (known as the in-phase component, I, and the quadrature component, Q) may be transmitted with a phase offset of 90°, and each signal may be transmitted with a specific amplitude selected from a finite set. The number of amplitude bins may influence the number of information bits that are conveyed by each symbol.

An OOK modulation scheme may be an example of amplitude modulation in which information is conveyed by simply transmitting either at a given amplitude (for an "on" part of the signal) or at a zero amplitude (for an "off" part of the signal). In some examples of the disclosure, a multicarrier (MC) waveform may be generated and modulated using multiple OOK patterns to generate a multicarrier wakeup signal. The OOK patterns used to generate the multicarrier wakeup signal may include multiple "on" and "off" time periods during one or more OFDM symbol periods to represent a single bit value (e.g., one information bit). The multicarrier wakeup signal (MC-OOK modulated) may then be transmitted from AP 105 to wakeup radio 117 of STA 115. Upon reception of the multicarrier wakeup signal, the STA 115 may decode the multicarrier wakeup signal. Based on the decoding, the STA 115 may choose to activate a second radio, such as the primary radio 116.

In aspects of the following, a transmitting device may utilize one or more transmit diversity schemes to improve the probability of successful communication of a wakeup signal to wakeup radio 117. The various transmit diversity schemes discussed below may leverage the structure of the wakeup signal and/or the modulation scheme of the wakeup signal to improve the orthogonality of different versions of the wakeup signal transmitted over each of a plurality of antennas. This orthogonality may improve the probability that wakeup radio 117 successfully decodes the information in the wakeup signal.

Figure 2:
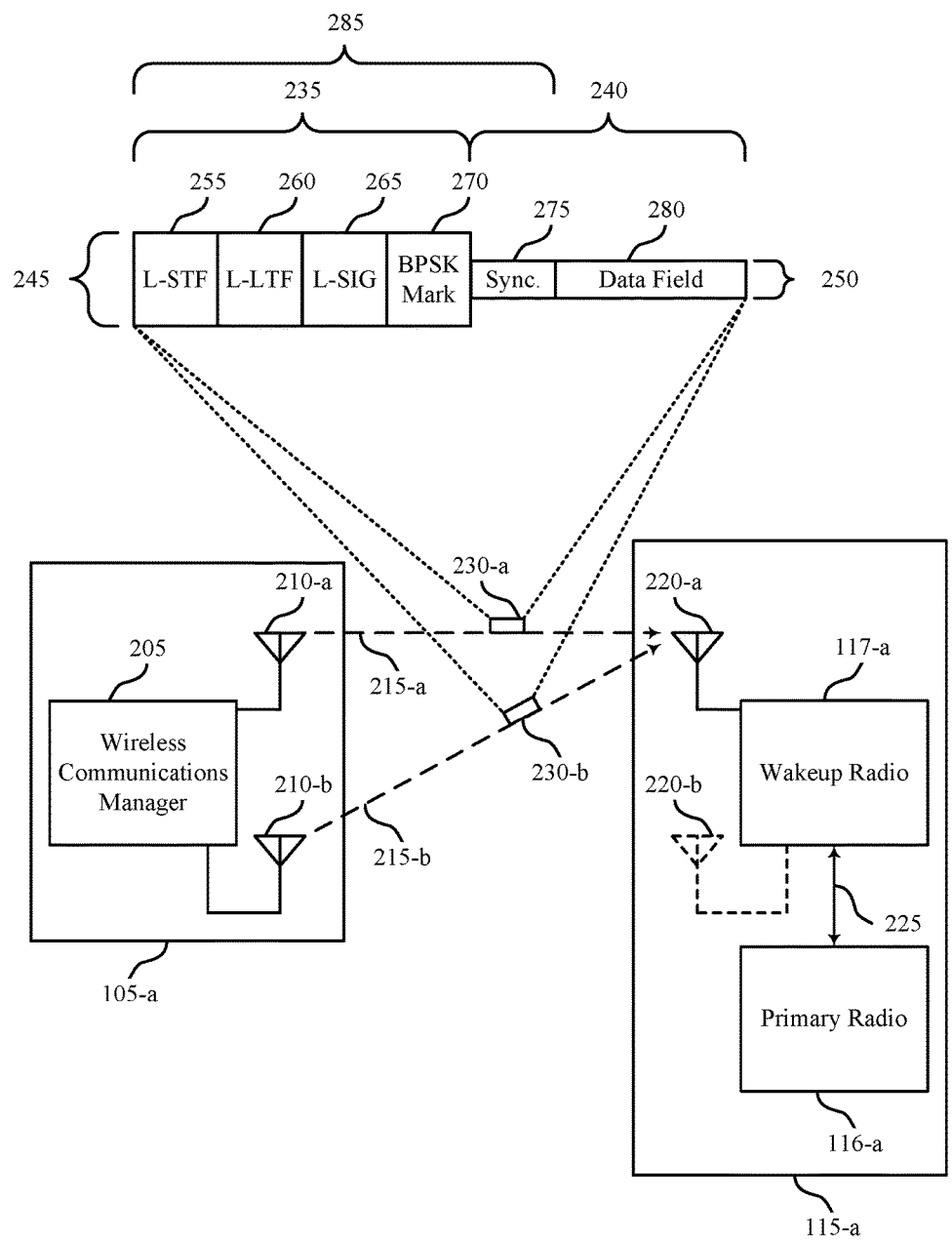
FIG. 2 illustrates an example of a wireless communications system that supports wakeup radio transmit diversity in accordance with aspects of the present disclosure.

FIG. 2 illustrates an example of a WLAN 200 supporting wakeup radio transmit diversity. WLAN 200 may include STA 115-a and AP 105-a, which may be examples of a STA 115 and an AP 105 described with reference to FIG. 1. In some examples, STA 115-a may be a low power or battery powered device, such as an IoT device. STA 115-a may include a primary radio 116-a and a wakeup radio 117-a. In some aspects, STA 115-a may listen for a wakeup signal using wakeup radio 117-a, and once received, STA 115-a may activate primary radio 116-a for higher throughput communications. In some examples, wakeup radio 117-a may be a low-power radio such as an SRR and/or may use OOK modulation to transmit or receive signals. In other aspects, STA 115-a may operate in a low power mode where wakeup radio 117-a may be used independently of primary radio 116-a for data communications. In some examples, primary radio 116-a may be a WLAN radio, including a WLAN transceiver, or a wireless wide area network (WWAN) radio, including a WWAN transceiver.

In some examples, AP 105-a may initiate communications with STA 115-a by transmitting a WUR frame 230 from each of multiple transmit antennas 210 over respective communication links 215. Though two transmit antennas 210 are illustrated for the sake of explanation, it is to be understood that AP 105-a may include any number (e.g., two, three, four, eight, etc.) of transmit antennas 210. For example, AP 105-a may generate WUR frame 230 based on waveform coding. Waveform coding may involve transforming a waveform to make detection of the waveform less error prone. For example, the multicarrier waveform may be modulated using multiple OOK patterns that represent different bit values. Each of the multiple OOK patterns may include one or more "on" portions and one or more "off" portions. The multicarrier waveform may then be masked based on the multiple OOK patterns and transmitted to wakeup radio 117-a of STA 115-a. Aspects of the waveform coding and transmit diversity techniques described herein may be performed by wireless communications manager 205, which may be an example of wireless communications manager 205 described with reference to FIG. 10.

In some cases, the data rate of the OOK patterns may be lower than an OFDM symbol rate (the data rate supported by primary radio 116-a) in order to provide good receiver sensitivity using wakeup radio 117-a. Construction of the OOK pattern may consist of forward error control (FEC) coding, spreading, encoding for direct current (DC) balance (e.g., using Manchester encoding), overlay mapping to a multicarrier waveform/signal, or a combination thereof. In some cases, the FEC coding, spreading, and/or DC balance encoding may each decrease the data rate of the OOK pattern such that their cumulative effect results in improved receiver sensitivity. In some cases, one of these techniques may be sufficient to produce the desired receiver sensitivity, while two or more of the techniques may be combined in other cases.

Once STA 115-a has received and decoded WUR frame 230 from AP 105-a, STA 115-a may choose to activate its primary radio 116-a (e.g., based on signaling conveyed over link 225). If primary radio 116-a is activated, data may then be exchanged over a second communication link, which may be capable of a higher throughput than communication link 215. WUR frame 230 may in some cases be transmitted in accordance with a WUR duty cycle schedule (which may be negotiated between STA 115-a and AP 105-a). In some examples, WUR frame 230 may be a unicast signal (intended specifically for STA 115-*a*), a multicast signal (intended for a group of STAs 115), or a broadcast signal (intended for any STA 115).

AP 105-*a* may transmit a multicarrier waveform by modulating the multicarrier waveform using multiple OOK patterns. In one example, AP 105-*a* may transmit an OOK "on" signal by powering multiple subcarriers. For instance, AP 105-*a* may power 13 subcarriers of a 64-point OFDM waveform for one or more first time periods (i.e., an OOK "on" periods) and not transmit (by not powering the same 13 subcarriers) for one or more second time periods (i.e., OOK "off" periods) to produce a 4 microsecond OOK signal representing a first bit value. The order and arrangement of OOK "on" and OOK "off" periods may make up an OOK pattern for the first bit value. AP 105-*a* may indicate a second bit value by not transmitting a signal during the one or more first time periods (i.e., OOK "off" periods) and transmitting for the one or more second time periods (i.e., OOK "on" periods), which together may make up an OOK pattern for the second bit value. In some examples, not powering the subcarriers may include masking the multicarrier waveform using the OOK patterns.

In some cases, OOK "on" periods may include transmitting energy over a subset of subcarriers of a channel (e.g., a narrowband transmission). For example 13 subcarriers comprising a 4 MHz bandwidth may make up the narrowband of a 20 MHz bandwidth making up the wideband channel (which may include 64 subcarriers in total). In some cases, the content of the subcarriers (e.g., tones) during an OOK "on" periods may encode additional information, carry a fixed or random sequence of tones, etc. For example, a fixed sequence may be transmitted on the tones or subcarriers during the OOK "on" period duration. In some cases, the fixed sequence may be selected to reduce or minimize a peak-to-average power ratio (PAPR) of WUR frame 230 (e.g., to facilitate higher transmission power, increased range, etc.). In other examples, additional information may be embedded into "on" subcarriers over the OOK "on" period. The additional information may be encoded as predefined sequences known to the receiver (e.g., one or more information bits may be encoded as a sequence of tones in each symbol period) and/or as modulated data in each "on" subcarrier or tone (e.g., using phase shift key modulation such as BPSK or quadrature phase shift keying (QPSK)). Such information may include, for example, wakeup signal identification information to inform non-WUR receivers of the signal type. In yet another example, each OOK "on" period may include a random data sequence, which may increase diversity (using different tone sequences from symbol period to symbol period may diversify the multicarrier waveform).

In some examples, the WUR frame 230 may be split into multiple time segments or periods, and the number of time segments as well as the length of each time segment may vary. Based on the time segments, different bit values may be represented. For example, the structure of the multiple time segments including OOK "on" and OOK "off" periods may represent a one bit value, and a different structure of the multiple time segments may represent a zero bit. In one example, AP 105-*a* may transmit a signal for a first time segment of the symbol period for a multicarrier waveform and may not transmit a signal for a second time segment of the multicarrier waveform symbol period. This structure may represent a one bit. In another example, AP 105-*a* may transmit no signal for the first time segment of the multicarrier waveform symbol period and may transmit a signal for the second time segment of the multicarrier waveform symbol period. This structure may represent a zero bit.

Wakeup radio 117-*a* may receive WUR frame 230 over respective communication link 215 at receive antenna 220-*a*. In aspects of the following, WUR frame 230 may be used to refer to the information and structure of the frame, while WUR frame 230-*a* and WUR frame 230-*b* may be specifically used to refer to the version of WUR frame 230 transmitted over respective transmit antennas 210-*a* and 210-*b*. In some cases, WUR frame 230-*a* may differ from WUR frame 230-*b* (e.g., based on one or more of the transmit diversity schemes described herein). Wakeup radio 117-*a* may leverage the diversity between WUR frame 230-*a* and WUR frame 230-*b* to improve the decodability of information in WUR frame 230 (e.g., by reducing noise, increasing signal power, etc.). Though described in the context of a single receive antenna 220-*a* (which may support low power operations), it is to be understood that in some cases wakeup radio 117-*a* may optionally include one or more additional receive antennas 220 (e.g., receive antenna 220-*b*). As such, wakeup radio 117-*a* may in some cases be able to perform one or more receive diversity techniques (e.g., Alamouti space-time block coding). In some such cases, the receive diversity may be enabled (or disabled) at STA 115-*a* based on control signaling received from AP 105-*a* (over primary radio 116-*a*).

WUR frame 230 may additionally or alternatively referred to as a wakeup message, wakeup signal, wakeup physical protocol data unit (PPDU), or the like. In some cases, WUR frame 230 may include a wideband portion 235 (which may be transmitted over a first frequency bandwidth 245, such as 20 MHz) and a narrowband portion 240 (which may be transmitted over a second frequency bandwidth 250, such as 4 MHz). Wideband portion 235 may in some cases include a legacy short training field (L-STF) 255, a legacy long training field (L-LTF) 260, a legacy signal field (L-SIG) 265, and a WUR Mark field 270 (which may also be referred to as a BPSK-Mark field). BPSK-Mark field 270 may, for example, represent a single symbol (e.g., a four microsecond OFDM symbol) using BPSK modulation (to avoid misclassification of BPSK-Mark field 270 as an 802.11 high throughput (HT) SIG field). In some cases, L-STF 255, L-LTF 260, and L-SIG 265 may be cumulatively referred to as a legacy preamble portion (which may allow legacy devices to determine a duration of WUR frame 230). Narrowband portion 240 may in some cases include a synchronization field 275 (which may alternatively be referred to as a WUR synchronization field) and a data field 280 (e.g., a WUR data field). In some cases, wideband portion 235 and synchronization field 275 may be cumulatively referred to as a WUR preamble 285. Synchronization field 275 may provide WUR packet detection, timing recovery, data rate signaling, or the like. In some cases, synchronization field 275 may include a plurality of two microsecond OFDM symbols.

Data field 280 may include a MAC frame. In some cases, data field 280 may be generated using one of two different data rates (e.g., a low data rate such as 62.5 kb/s and a high data rate such as 250 kb/s). In some cases, the low data rate variant of data field 280 may utilize four microsecond OFDM symbols while the high data rate variant of data field 280 may utilize two microsecond OFDM symbols. As an example, in a high data rate variant of data field 280, a '0' bit may be conveyed by a two microsecond "on" symbol followed by a two microsecond "off" symbol. Conversely, a '1' bit may be conveyed by a two microsecond "off" symbol followed by a two microsecond "on" symbol. Similarly, in a low data rate variant of data field 280, a '0' bit may be conveyed by a four microsecond "on" symbol, then a four microsecond "off" symbol, then a four microsecond "on" symbol, then a four microsecond "off" symbol. Conversely, a '1' bit may be conveyed by a four microsecond "off" symbol, then a four microsecond "on" symbol, then a four microsecond "off" symbol, then a four microsecond "on" symbol. These examples may use OOK, such as MC-OOK modulation, as further described herein.

The "on" symbols (or the off symbol) may be constructed using a low peak to average power ratio OFDM symbol, for example as further described with reference to FIG. 4. Such symbols may be a two microsecond symbol, or a four microsecond symbol, or a two microsecond signal that is the first half or the second half of a four microsecond symbol. The "on" symbol may use a 64-point FFT and/or have a 16-sample cyclic prefix.

Figure 3:
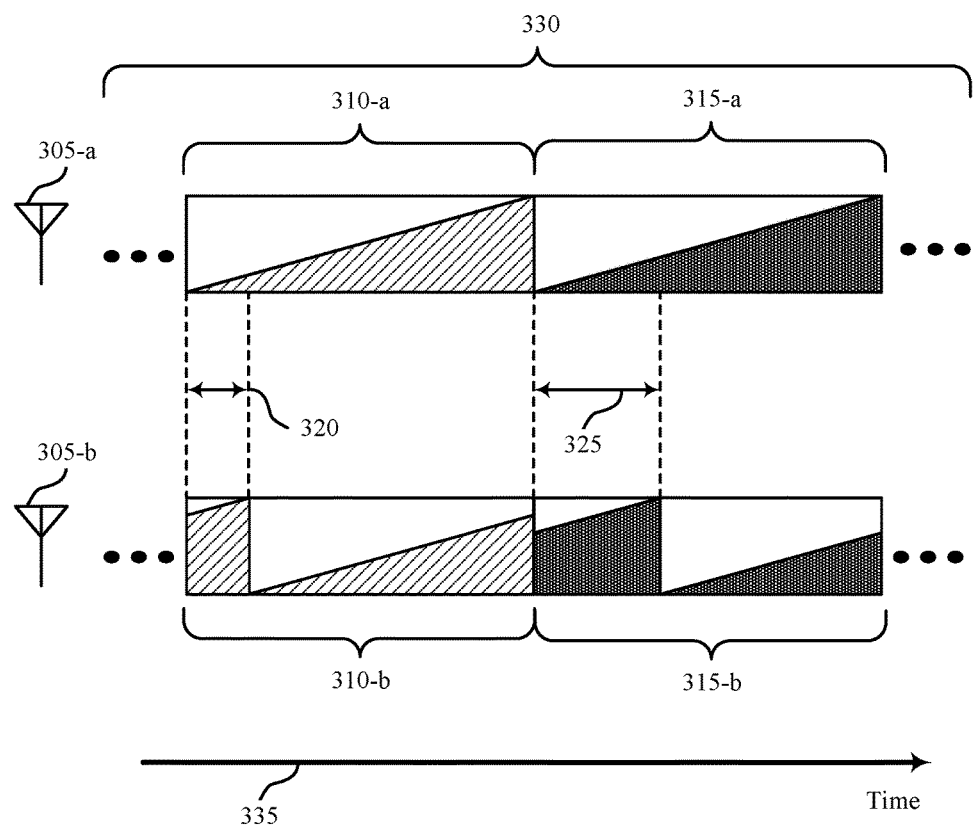
FIG. 3 illustrates an example of a transmit diversity scheme that supports wakeup radio transmit diversity in accordance with aspects of the present disclosure.

FIG. 3 illustrates an example transmit diversity scheme 300 that supports wakeup radio transmit diversity in accordance with aspects of the present disclosure. In some cases, transmit diversity scheme 300 may apply to a wakeup message 330 transmitted from a device such as an AP 105 (e.g., as described with reference to FIGS. 1 and 2). As illustrated, the transmitting device may in some cases include two transmit antennas 305 (e.g., though it is to be understood that the described techniques may apply to any suitable number of transmit antennas 305, which may include 3, 4, 6, 8, etc., antennas).

As illustrated, a wakeup message 330 may include a first portion 310 and a second portion 315. For example, first portion 310 may correspond to wideband portion 235 described with reference to FIG. 2 and second portion 315 may correspond to narrowband portion 240 described with reference to FIG. 2. Thus, it is to be understood that while horizontal axis 335 represents time, a vertical axis of transmit diversity scheme 300 may, but does not necessarily, convey information regarding a frequency bandwidth. In aspects of the following wakeup message 330, first portion 310, and second portion 315 may be used to refer to the information and structure of the frame, while first portion 310-*a*, second portion 315-*a*, first portion 310-*b*, and second portion 315-*b* may be specifically used to refer to the version of wakeup message 330 transmitted over corresponding transmit antennas 305-*a* and 305-*b*.

In some cases, first portion 310 may correspond to synchronization field 275 of a wakeup message 330 and second portion 315 may correspond to data field 280 of the same wakeup message 330, as synchronization field 275 and data field 280 are described with reference to FIG. 2. It is to be understood that wakeup message 330 may in some cases include additional portions besides first portion 310 and second portion 315. In some cases, first portion 310 and second portion 315 may not comprise temporally adjacent portions of wakeup message 330. By way of example, first portion 310 may refer to each of a plurality of symbols included in synchronization field 275 (or each of a plurality of symbols included in wideband portion 235). In some cases, symbols (e.g., OFDM symbols) of first portion 310 may have a first duration and symbols of second portion 315 may have a second duration. For example, when first portion 310 corresponds to wideband portion 235 and second portion 315 corresponds to narrowband portion 240, the first duration may be longer than the second duration. Alternatively, when first portion 310 corresponds to synchronization field 275 and second portion 315 corresponds to a low data rate variant of data field 280, the first duration may be shorter than the second duration. Thus, in various examples, first portion 310 and second portion 315 may vary in bandwidth and/or symbol duration.

In accordance with aspects of the present disclosure, a first cyclic delay 320 (e.g., a first cyclic shift, which may be indicated or measured by a cyclic delay value or cyclic shift value) may be applied to first portion 310-*b* at transmit antenna 305-*b* (relative to first portion 310-*a* at transmit antenna 305-*a*). For example, first cyclic delay 320 may comprise rotating a number of samples from the end of first portion 310-*b* to the beginning of first portion 310-*b* (where the number of samples corresponds to a duration of first cyclic delay 320). In some cases, first cyclic delay 320 may be applied to each of a plurality of OFDM symbols (within a given portion of wakeup message 330 such as wideband portion 235 or synchronization field 275). That is, each OFDM symbol may have samples rotated from the end of the symbol to the beginning of the symbol in accordance with first cyclic delay 320. Similarly, a second cyclic delay 325 (e.g., a second cyclic shift, which may be indicated or measured by a cyclic delay value or cyclic shift value) may be applied to second portion 315-*b* at transmit antenna 305-*b* (relative to second portion 315-*a* at transmit antenna 305-*a*). For example, second cyclic delay 325 may comprise rotating a number of samples from the end of second portion 315-*b* to the beginning of second portion 315-*b* (where the number of samples corresponds to a duration of second cyclic delay 325).

In some cases, second cyclic delay 325 may have a longer duration than first cyclic delay 320. For example, a transmitting device may apply a short cyclic delay to a wideband portion of the wakeup message 330 (or to a legacy preamble of the wakeup message 330 as discussed with reference to FIG. 2) and a longer cyclic delay to the narrowband portion of the wakeup message 330. In some cases, the comparative lengths of first cyclic delay 320 and second cyclic delay 325 may be based on a bandwidth of the portion to which the cyclic delay is applied, a symbol duration of the portion to which the cyclic delay is applied, or a combination thereof.

Similarly, a transmitting device may apply a short cyclic delay to a synchronization field of the wakeup message and a longer cyclic delay to a low data rate data field of the wakeup message. As discussed above, the symbol duration of a synchronization field of a wakeup message may be two microseconds. The symbol duration of a data field of the wakeup message may be two microseconds (e.g., for a high data rate data field) or four microseconds (e.g., for a low data rate data field). Thus, in some cases it may be beneficial to use a different transmit diversity scheme (e.g., a different cyclic delay) for the synchronization field and the data field (because of the difference in symbol durations for the synchronization field and the low data rate data field).

By way of example, the following set of delay values may be used for a set of antennas, up to eight antennas, where the first value corresponds to the delay applied at the first antenna (e.g., transmit antenna 305-*a*), the second value corresponds to the first cyclic delay 320 applied at the second antenna (e.g., transmit antenna 305-*b*), the third value corresponds to a third cyclic delay applied at the third antenna, etc. In examples where there are two transmit antennas, the first delay value and the second delay value (from left to right) may be used. In examples where there are three transmit antennas, the first delay value, the second delay value, and the third delay value (from left to right) may be used. And so on up to eight antennas. It is to be understood that these values are included for the sake of explanation and are not limiting of scope.

[0 μs −1 μs −0.5 μs −1.5 μs −0.75 μs −1.25 μs −0.25 μs −1.75 μs]

In this example, these delays may correspond to respective first cyclic delay 320 durations for each of a plurality of (e.g., seven) transmit antennas 305 relative to a first transmit antenna (e.g., transmit antenna 305-*a*). By way of example, transmit antenna 305-*b* may apply first cyclic delay 320 (e.g., having a duration of 1 μs) to each symbol of a synchronization field (e.g., corresponding to first portion 310-*b*) of wakeup message 330 relative to first portion 310-*a*. Alternatively, first cyclic delay 320 may be applied to the OFDM waveform representing the synchronization field as a whole (as discussed further below).

In some cases (e.g., for a high data rate variant of a data field), the same set of delays may be used for the synchronization field and the data field. Alternatively, a different set of delays may be used for the data field (e.g., for a low data rate variant of a data field). By way of example, the following set of delay values may be used for a set of eight antennas, where the first value corresponds to the second cyclic delay 325 applied at the first antenna (e.g., transmit antenna 305-*a*), the second value corresponds to the second cyclic delay 325 applied at the second antenna (e.g., transmit antenna 305-*b*), the third value corresponds to a third cyclic delay applied at the third antenna, etc. In examples where there are two transmit antennas, the first delay value and the second delay value (from left to right) may be used. In examples where there are three transmit antennas, the first delay value, the second delay value, and the third delay value (from left to right) may be used. And so on up to eight antennas. It is to be understood that these values are included for the sake of explanation and are not limiting of scope.

[0 μs −2 μs −1 μs −3 μs −1.5 μs −2.5 μs −0.5 μs −3.5 μs]

In the present example, these delay values may correspond to respective second cyclic delay 325 durations for each of a plurality of (e.g., seven) transmit antennas 305 relative to a first transmit antenna (e.g., transmit antenna 305-*a*). By way of example, transmit antenna 305-*b* may apply second cyclic delay 325 (e.g., having a duration of 2 μs) to each symbol of a low data rate data field (e.g., corresponding to second portion 315-*b*) of wakeup message 330 relative to second portion 315-*a*. Alternatively, second cyclic delay 325 may be applied to the OFDM waveform representing the synchronization field as a whole.

In some cases, first cyclic delay 320 and second cyclic delay 325 may be optimized (e.g., jointly optimized or separately optimized) to minimize losses due to destructive interference between different received versions of wakeup message 330. By way of example, for a given 'on' symbol $S_1$ (which may be a two microsecond symbol or a four microsecond symbol or a two microsecond signal that is the first half or the second half of a four microsecond symbol) transmitted over transmit antenna 305-*a*, a second symbol $S_2$ transmitted over transmit antenna 305-*b* may be defined as a cyclic shift or delay of S (e.g., $S_2 = CSD(S_1, \tau)$ where τ is the duration of first cyclic delay 320 or second cyclic delay 325). In this example, a random variable m may be defined as $m = \|S_1 + S_2 e^{j\theta}\|^2$ where θ is a randomly-selected phase that can take on values between 0 and 2π. In some examples, τ may be selected so as to minimize or decrease the variance of m (such that the variance of the sum of the two signals is small/low, minimized, and/or maintained to be as close as feasible to constant regardless of phase rotation).

Figure 4:
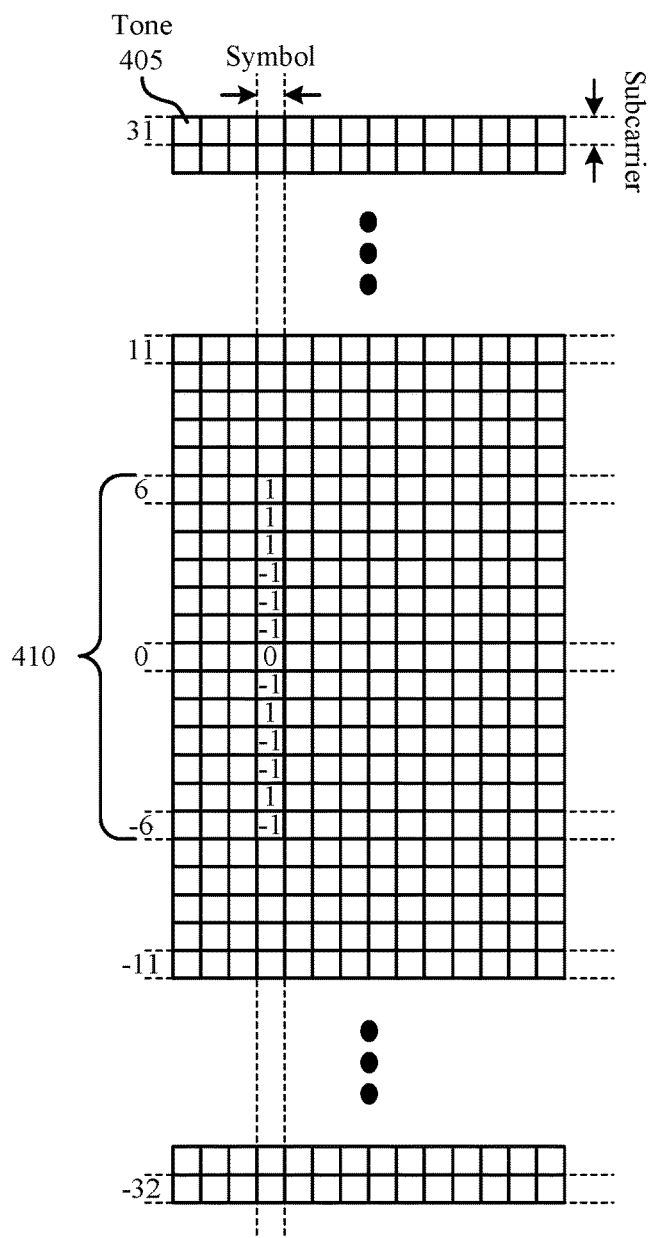
FIG. 4 illustrates an example of a channel subcarrier configuration that supports wakeup radio transmit diversity in accordance with aspects of the present disclosure.

FIG. 4 illustrates an example of a channel subcarrier configuration 400 that supports wakeup radio transmit diversity in accordance with aspects of the present disclosure. Channel subcarrier configuration 400 may represent the operations of wireless devices, such as STAs 115 and APs 105. For example, a transmitter, such as an AP 105, may transmit a waveform according to channel subcarrier configuration 400 to a receiver, such as a STA 115.

Channel subcarrier configuration 400 may include multiple subcarriers. A tone 405 may refer to a subcarrier over the duration of a single symbol period. Sequences (e.g., tone sequences) as described herein may be transmitted across tones 405 of a single symbol period. In some cases, OOK "on" periods may consist of transmitting energy over subcarrier set 410 (e.g., a narrowband transmission). For example, channel subcarrier configuration 400 may include 64 subcarriers indexed from tone −32 to tone 31 [−32:31]. Subcarrier set 410 may be designated for sequences over a subset of the subcarriers, such as subcarriers indexed [−6:6]. That is, subcarrier set 410 may be used for transmitting sequences during OOK "on" periods. OOK "on" periods may last for the duration of an integer multiple of a symbol period.

For example, a fixed sequence may be transmitted on tones 405 associated with subcarriers within subcarrier set 410 across one or more symbol periods. In some cases, the fixed sequence may be selected to reduce the PAPR of the wakeup signal (e.g., to facilitate higher transmission power, increased range, etc.). For a 12 subcarrier+1 DC subcarrier (e.g., center subcarrier indexed [0], where 0 is the DC subcarrier) configuration, a BPSK sequence (e.g., having a lowest PAPR) may be, from a first subcarrier to a thirteenth subcarrier within subcarrier set 410 (e.g., from tone index [−6] to tone index [6]):

[1 1 1 −1 −1 −1 0 −1 1 −1 −1 1 −1]

as illustrated in channel subcarrier configuration 400, as one example to illustrate techniques discussed herein. The preceding BPSK sequence may be a null center tone or null DC tone transmission. For a 13 subcarrier with non-zero DC configuration (e.g., center subcarrier indexed [0] is not a DC tone), a BPSK sequence (e.g., having a lowest PAPR) may be, from a first subcarrier to a thirteenth subcarrier within subcarrier set 410 (e.g., from tone index [−6] to tone index [6]), as shown below.

[1 1 1 −1 −1 −1 1 1 −1 1 1 −1 1]

The preceding BPSK sequence may be a non-zero center tone or non-zero DC tone transmission, as another example to illustrate techniques discussed herein. Such fixed sequences may further be multiplied by a complex constant while maintaining the same or equivalent PAPR properties. The above BPSK sequence multiplied by the complex constant −j may be as illustrated below.

[−j −j −j j j j −j −j j −j −j j j]

In some cases, a fixed sequence may include a portion of a tone sequence of a symbol of a legacy preamble (from a symbol of a L-LTF tone sequence as defined in 802.11a). In such an example, subcarriers within subcarrier set 410 may be populated as illustrated below (e.g., from tone index [−6] to tone index [6], where center subcarrier [0] is the DC subcarrier).

[1 −1 1 1 1 1 0 1 −1 −1 1 1 −1]

In other examples, additional information may be encoded into subcarriers or tones 405 during "on" symbol periods (carried on subcarriers during the OOK "on" period, but not during the OOK "off" period). The additional information may be encoded as predefined sequences known to the receiver and/or as modulated data in each "on" subcarrier or tone (e.g., BPSK or QPSK modulated data). Such information may include, for example, wakeup signal identification information to inform non-WUR receivers of the signal type, a basic service set identifier (BSSID), etc.

The additional information may be the same as information conveyed through OOK modulation described above with reference to FIG. 2 (e.g., information of a wakeup message) or may be different information.

In the case where information bits are encoded as predefined sequences known to the receiver, $2^N$ sets of sequences may be defined for N-bit information granularity. That is, $2^N$ sets of sequences may be defined for the subcarrier set 410 of a symbol period, with each sequence corresponding to one combination of that N-bit information set. For example, 2 information bits may be encoded in a single symbol (e.g., symbol period) using 4 different sets of tone sequences. In some examples, each of the $2^N$ sets of sequences may be orthogonal to each other of the $2^N$ sets of sequences. Depending on the N-bit information to be sent, the corresponding sequence may be transmitted using tones 405 of subcarriers within subcarrier set 410 during the OOK "on" period (e.g., one or more symbol periods).

Alternatively, tones 405 may carry information. For example, each tone 405 may encode one or more information bits (as opposed to a set of tone sequences encoding one or more information bits as described above). In one example, subcarrier set 410 may carry BPSK, QPSK, or QAM (e.g., 16 QAM, 64 QAM, etc.) modulated data, where tones 405 are a BPSK, QPSK, or QAM tone. The data may be coherently demodulated at a receiver using the channel estimated from a training field (e.g., a L-LTF). For example, the encoded information may enable non-WUR receivers to understand or identify the received signal as a wakeup signal.

In yet another example, each OOK "on" period may include a random data sequence in subcarrier set 410 to increase diversity (e.g., different data sequences to diversify the waveform). For each "on" symbol period(s) of the OOK pattern, random sequences of tones may be sent (e.g., over the tones 405) within subcarrier set 410. Diversity may be increased by sending a different data sequence for each OOK "on" period.

Various techniques for implementing transmit diversity scheme 300 are considered herein. In a first example, a transmitting device may generate a base OFDM symbol (based on a given tone sequence). If only a portion of the OFDM symbol is needed (e.g., two microseconds out of four microseconds), the transmitting device may select an appropriate portion of the generated OFDM symbol. Next, the transmitting device may apply a cyclic delay (e.g., first cyclic delay 320 or second cyclic delay 325) to the OFDM symbol (or portion of the OFDM symbol) for a given transmit antenna of multiple transmit antennas. Then, the transmitting device may use the CSD version of the OFDM symbol (or portion thereof) as the "on" symbol in the MC-OOK waveform.

In a second example, the device may first generate an OFDM waveform which is the length of the entire narrowband portion of the wakeup message (or other portion of the wakeup message which is to have a given cyclic delay applied). For example, the OFDM waveform may be represented as a concatenated string of fifty OFDM symbols (or some other number of symbols). Next, the transmitting device may apply the cyclic delay (e.g., first cyclic delay 320 or second cyclic delay 325) to the entire waveform at a given transmit antenna. Then, the transmitting device may apply OOK modulation to the cyclic delay version of the OFDM waveform.

Figure 5:
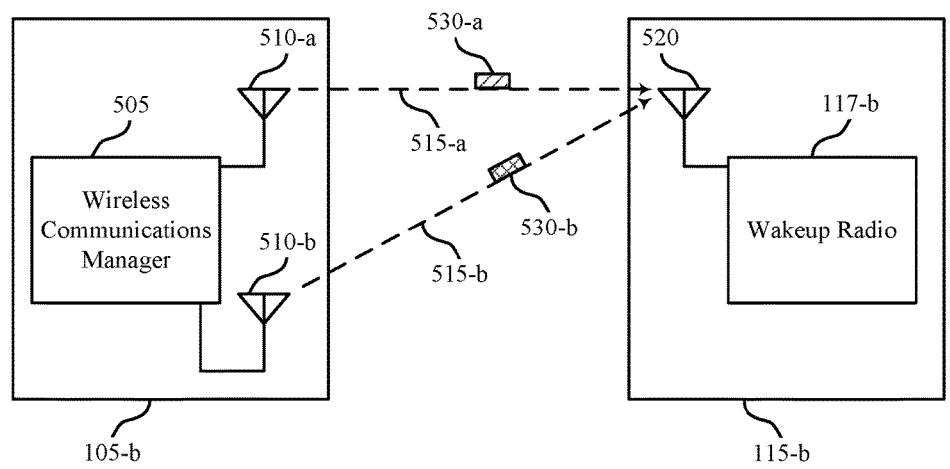
FIG. 5 illustrates an example of a wireless communications system that supports wakeup radio transmit diversity in accordance with aspects of the present disclosure.

FIG. 5 illustrates an example wireless communications system 500 supporting wakeup radio transmit diversity. Wireless communications system 500 may include STA 115-b and AP 105-b, which may be examples of a STA 115 and an AP 105 described with reference to FIG. 1. In some examples, STA 115-b may be a low power or battery powered device, such as an IoT device. STA 115-b may include a primary radio and a wakeup radio 117-b. In some aspects, STA 115-b may listen for a wakeup signal using wakeup radio 117-b, and once received, STA 115-b may activate its primary radio for higher throughput communications. In some examples, wakeup radio 117-b may be a low-power radio such as an SRR and/or may use OOK modulation (e.g., MC-OOK modulation) to transmit or receive signals. In other aspects, STA 115-b may operate in a low power mode where wakeup radio 117-b may be used independently of the primary radio for data communications. In some examples, the primary radio may be a WLAN radio, including a WLAN transceiver, or a WWAN radio, including a WWAN transceiver.

Wireless communications system 500 illustrates a second transmit diversity scheme (which may be used in addition to or instead of transmit diversity scheme 300). As illustrated, AP 105-b may in some cases include two transmit antennas 510 (though it is to be understood that the described techniques may apply to any suitable number of transmit antennas 510). In aspects of the following, wireless communications manager 505 may transmit a first version of a wakeup message (e.g., wakeup message 530-a) from transmit antenna 510-a and a second version of the wakeup message (e.g., wakeup message 530-b) from transmit antenna 510-b. In some cases, wakeup message 530-a and wakeup message 530-b may each be modulated using OOK (e.g., MC-OOK).

Wakeup radio 117-b may receive (via receive antenna(s) 520) wakeup message 530-a and wakeup message 530-b over respective communication links 515-a and 515-b (which may represent different over-the-air (OTA) conditions experienced by the wakeup messages 530 such as path loss, additive white Gaussian noise (AWGN), etc.). As discussed above, wakeup radio 117-b may in some cases decode OOK-modulated waveforms based on the OOK symbols (rather than the underlying OFDM waveform). In accordance with aspects of the following, the OFDM symbols used to generate the OFDM waveforms for wakeup message 530-a and wakeup message 530-b may differ (without negatively effecting the decodability of the information associated with wakeup message 530).

As an example in the context of four transmit antennas 510 (though any number of transmit antennas 510 may be used), a different OFDM symbol (or OFDM waveform) may be generated for each transmit antenna before applying the OOK modulation. That is, wireless communications manager 505 may in some cases use different tone sets (as described with reference to FIG. 4) to generate OFDM symbols or waveforms for each transmit antenna 510 to convey a single WUR frame (e.g., one wakeup message) to a receiver device. In some examples, at least one of the transmit antennas may have a different OFDM symbol during a given symbol period, while other transmit antennas during the same symbol period may use the same OFDM symbols. In other examples, during one or more of the symbol periods, all the transmit antennas may have the same OFDM symbol periods, but the transmit antennas may use different OFDM symbols during different symbol periods for the same WUR frame. In some examples, the different tone sets may differ by at least one symbol or tone of the tone set.

In some cases, the OFDM symbols may be generated so as to minimize the variance in a combination of the OFDM symbols across a possible set of random phase rotations relative to the first symbol. By way of example, a random variable m may be defined where $m = \|S_1 + S_2\ e^{j\theta_2} + S_3 e^{j\theta_3} + S_4 e^{j\theta_4}\|^2$ where $S_i$ represents the OFDM symbol transmitted over a transmit antenna i, (e.g., transmit antenna 510), and $\theta_i$ represents the random phase rotation resulting from the communication link 515 associated with the transmit antenna i, and $\|\ \|^2$ indicates the norm squared of that signal. In accordance with aspects of the present, the OFDM symbols S for the transmit antennas 510 may be jointly optimized (e.g., to minimize the variance of m over a given range of phase rotations). That is, symbols $S_1$, $S_2$, $S_3$, and $S_4$ may be selected (configured for the transmitting wireless device) to minimize the variance of the random variable m over all possible random phase rotations, $\theta_1$, $\theta_2$, $\theta_3$, and $\theta_4$ for the corresponding symbols. The random phase may be any value between 0 and $2\pi$.

Figure 6:
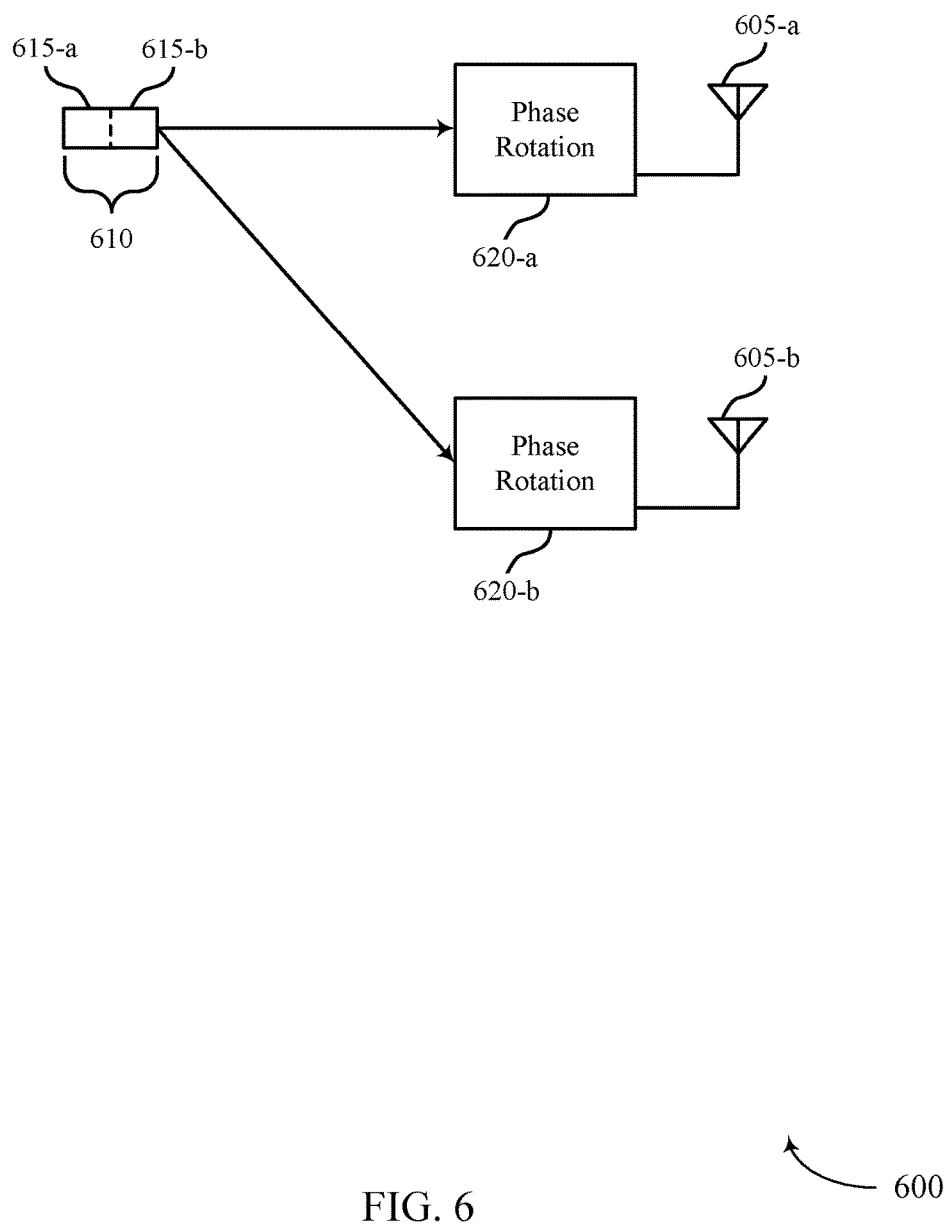
FIG. 6 illustrates an example of a transmit diversity scheme that supports wakeup radio transmit diversity in accordance with aspects of the present disclosure.

FIG. 6 illustrates an example transmit diversity scheme 600 that supports wakeup radio transmit diversity in accordance with aspects of the present disclosure. In some cases, transmit diversity scheme 600 may apply to a wakeup message transmitted from a device such as an AP 105 (e.g., as described with reference to FIGS. 1 and 2). As illustrated, the transmitting device may in some cases include two transmit antennas 605 (though it is to be understood that the described techniques may apply to any suitable number of transmit antennas 605).

The wakeup message (WUR frame) may be comprised of a plurality of symbols 610. One or more of the symbols 610, may be divided into multiple portions of the symbol in accordance with aspects of the present example (e.g., first portion 615-a and second portion 615-b). Symbol 610 may be divided into any number of portions 615 without deviating from the scope of the described techniques. In aspects of the following, second portion 615-b may undergo a first phase rotation 620-a relative to first portion 615-a before being transmitted from transmit antenna 605-a (a first transmit antenna) and may undergo a second phase rotation 620-b relative to first portion 615-a before being transmitted from transmit antenna 605-b (a second transmit antenna).

As an example, first phase rotation 620-a may not apply a phase rotation to first portion 615-a or second portion 615-b, while second phase rotation 620-b may apply a 180° rotation (by multiplying the phase by −1) to first portion 615-a but may not apply a phase rotation to second portion 615-b. Such a scheme may improve decodability of symbol 610 (because if first portion 615-a transmitted over transmit antenna 605-a destructively interferes with first portion 615-a transmitted over transmit antenna 605-b, second portion 615-b may constructively interfere (combine) at the receiving device.

In general, a transmitting device may generate a base OFDM symbol (e.g., symbol 610). The signals transmitted on each transmit antenna 605 may be constructed by multiplying the base OFDM symbol by a phase rotation signal (which may apply different phase rotations during different parts of the symbol 610). For the $n^{th}$ transmit antenna 605, the following phase rotation signal (e.g., corresponding to the operations of phase rotation 620) may be generated:

$$x_n(t) = \begin{cases} e^{j\phi n1}, & 0 \le t < \frac{T}{4} \\ e^{j\phi n2}, & \frac{T}{4} \le t < \frac{T}{2} \\ e^{j\phi n3}, & \frac{T}{2} \le t < \frac{3T}{4} \\ e^{j\phi n4}, & \frac{3T}{4} \le t < T \end{cases}$$

where T represents the length of symbol 610.

Such a scheme may have a different phase rotation in each of the (e.g., four) portions 615 of symbol 610. Additionally, this scheme may produce different phase rotations across transmit antennas 605 (e.g., for a given portion of symbol 610). For the $n^{th}$ transmit antenna 605, point-wise multiplication may be performed between the base OFDM symbol and the phase rotation signal, as: $S_n(t) = x_n(t) \times S(t)$.

Figure 7:
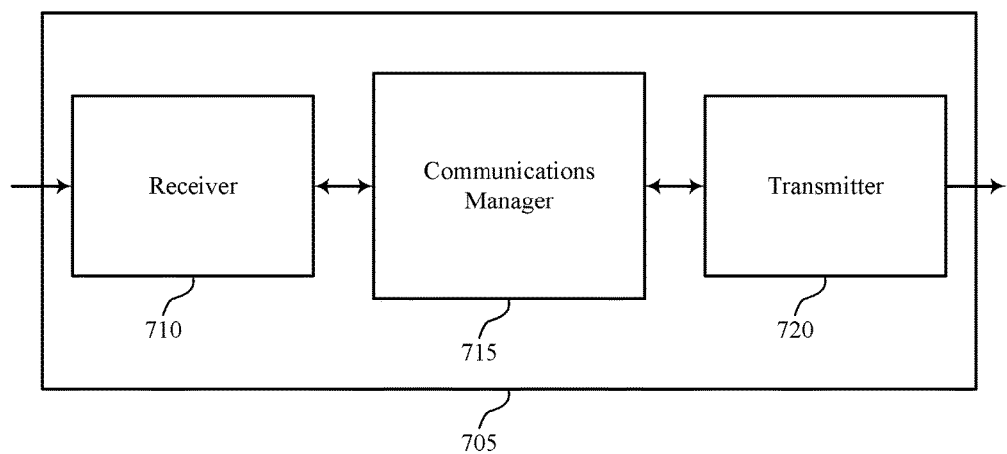
FIGS. 7 through 9 show block diagrams of a device that supports wakeup radio transmit diversity in accordance with aspects of the present disclosure.

FIG. 7 shows a block diagram 700 of a wireless device 705 that supports wakeup radio transmit diversity in accordance with aspects of the present disclosure. Wireless device 705 may be an example of aspects of a STA 115 or an AP 105 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to wakeup radio transmit diversity, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may identify, for a first portion of a wakeup radio frame, a first set of cyclic delay values corresponding to a set of antennas of the first wireless device. Communications manager 715 may identify, for a second portion of the wakeup radio frame, a second set of cyclic delay values corresponding to the set of antennas. Communications manager 715 may apply the first set of cyclic delay values to symbols of the first portion of the wakeup radio frame for the set of antennas and the second set of cyclic delay values to symbols of the second portion of the wakeup radio frame for the set of antennas to generate cyclically-shifted wakeup signals for the set of antennas. Communications manager 715 may transmit the cyclically-shifted wakeup signals to a second wireless device using the set of antennas.

The communications manager 715 may also or alternatively identify a set of antennas to be used to transmit a wakeup radio frame to a second wireless device. Communications manager 715 may generate, for at least a portion of the wakeup radio frame, a first set of OFDM symbols to be transmitted using a first antenna of the set of antennas and a second set of OFDM symbols to be transmitted using a second antenna of the set of antennas. Communications manager 715 may modulate the first set of OFDM symbols using on-off keying to generate a first modulated wakeup signal for the first antenna. Communications manager 715 may modulate the second set of OFDM symbols using the on-off keying to generate a second modulated wakeup signal for the second antenna. Communications manager 715 may transmit the first modulated wakeup signal using the first antenna and the second modulated wakeup signal using the second antenna.

The communications manager 715 may also identify a set of antennas to be used to transmit a wakeup radio frame to a second wireless device. Communications manager 715 may generate, for at least a portion of the wakeup radio frame, a set of OFDM symbols to be transmitted by the set of antennas. Communications manager 715 may divide each of the OFDM symbols of the set of OFDM symbols into a set of segments. Communications manager 715 may apply, for each of the set of antennas, a different set of phase rotations to the set of segments to generate a set of phase-rotated wakeup signals corresponding to the wakeup radio frame. Communications manager 715 may transmit the set of phase-rotated wakeup signals using the set of antennas.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
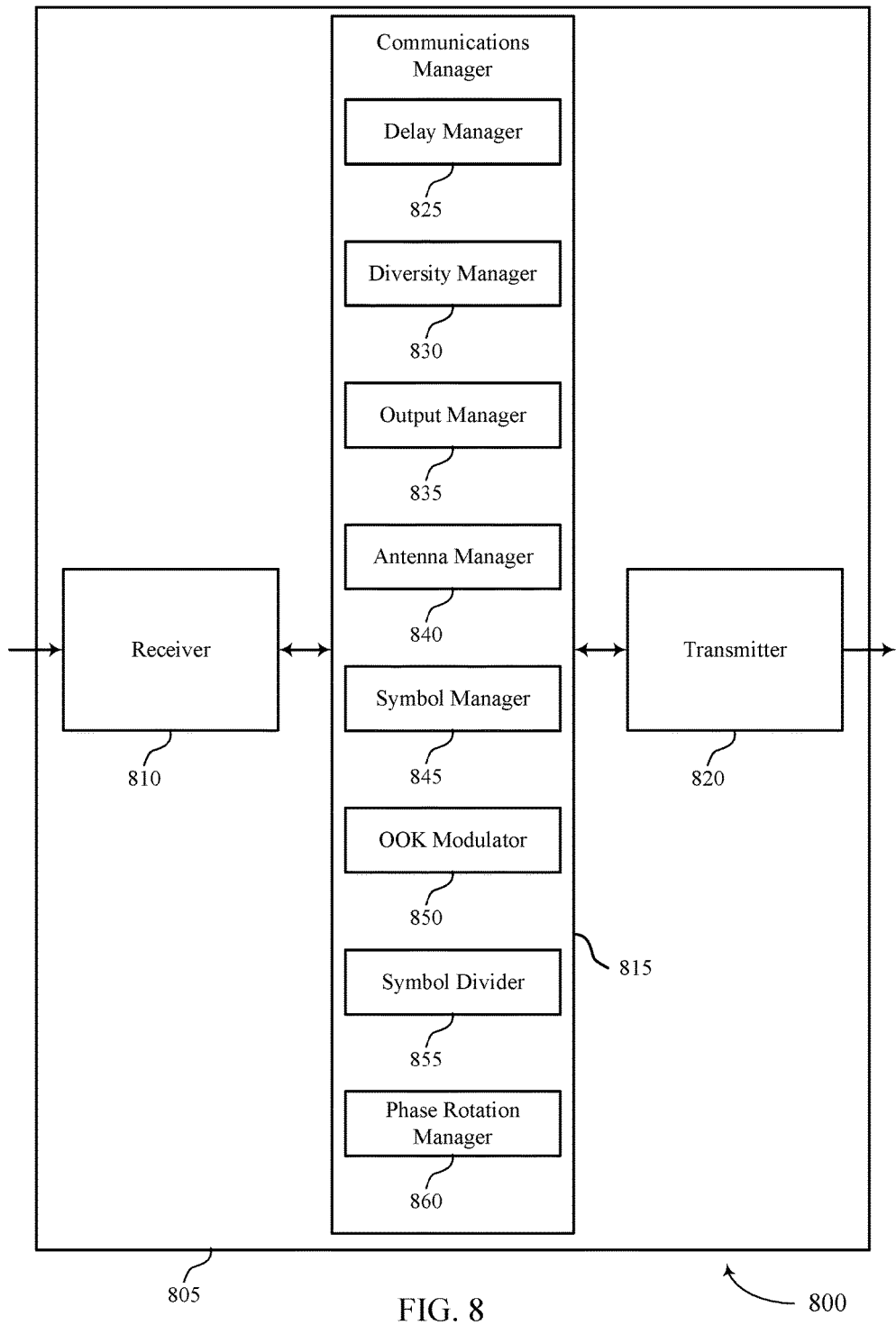

FIG. 8 shows a block diagram 800 of a wireless device 805 that supports wakeup radio transmit diversity in accordance with aspects of the present disclosure. Wireless device 805 may be an example of aspects of a wireless device 705 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to wakeup radio transmit diversity, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include delay manager 825, diversity manager 830, output manager 835, antenna manager 840, symbol manager 845, OOK modulator 850, symbol divider 855, and phase rotation manager 860.

Delay manager 825 may identify, for a first portion of a wakeup radio frame, a first set of cyclic delay values corresponding to a set of antennas of the first wireless device. Delay manager 825 may identify the first set of cyclic delay values based on a first bandwidth for the first portion of the wakeup radio frame. Delay manager 825 may identify the second set of cyclic delay values based on a second bandwidth for the second portion of the wakeup radio frame. In some cases, cyclic delay values of the first set of cyclic delay values corresponding to the set of antennas are equal to or less than cyclic delay values of the second set of cyclic delay values corresponding to the set of antennas. Delay manager 825 may identify the first set of cyclic delay values based on a first data rate for the first portion of the wakeup radio frame. Delay manager 825 may identify, for a second portion of the wakeup radio frame, a second set of cyclic delay values corresponding to the set of antennas. In some cases, cyclic delay values of the first set of cyclic delay values corresponding to the set of antennas are equal to or greater than cyclic delay values of the second set of cyclic delay values corresponding to the set of antennas.

Delay manager 825 may identify the second set of cyclic delay values based on a second data rate for the second portion of the wakeup radio frame. In some cases, a synchronization field and a data field having a second bandwidth smaller than the first bandwidth. In some cases, the first bandwidth is larger than the second bandwidth. In some cases, the first data rate is greater than the second data rate. In some cases, the first portion of the wakeup radio frame includes at least a synchronization field of the wakeup radio frame. In some cases, the second portion of the wakeup radio frame includes at least a data field of the wakeup radio frame. In some cases, the wakeup radio frame includes a L-STF, a L-LTF, a L-SIG, and a binary phase shift keying (BPSK)-Mark field having a first bandwidth.

Diversity manager 830 may apply the first set of cyclic delay values to symbols of the first portion of the wakeup radio frame for the set of antennas and the second set of cyclic delay values to symbols of the second portion of the wakeup radio frame for the set of antennas to generate cyclically-shifted wakeup signals for the set of antennas. Diversity manager 830 may apply the second set of cyclic delay values to at least a portion of each of the set of OFDM symbols. Diversity manager 830 may apply the second set of cyclic delay values to the OFDM waveform for the set of antennas to generate a cyclically-shifted OFDM waveform. In some cases, applying the second set of cyclic delay values to the second portion of the wakeup radio frame includes generating a set of OFDM symbols including the second portion.

Output manager 835 may transmit the cyclically-shifted wakeup signals to a second wireless device using the set of antennas. Output manager 835 may transmit the first modulated wakeup signal using the first antenna and the second modulated wakeup signal using the second antenna. Output manager 835 may transmit the set of phase-rotated wakeup signals using the set of antennas.

Antenna manager 840 may identify a set of antennas to be used to transmit a wakeup radio frame to a second wireless device.

Symbol manager 845 may generate, for at least a portion of the wakeup radio frame, a first set of OFDM symbols to be transmitted using a first antenna of the set of antennas, and a second set of OFDM symbols to be transmitted using a second antenna of the set of antennas. Symbol manager 845 may generate, for at least a portion of the wakeup radio frame, a set of OFDM symbols to be transmitted by the set of antennas. In some cases, applying the second set of cyclic delay values to the second portion of the wakeup radio frame includes generating a set of OFDM symbols including the second portion. In some cases, at least one of the first set of OFDM symbols is different from a corresponding at least one of the second set of OFDM symbols. In some cases, generating the first set of OFDM symbols and the second set of OFDM symbols, includes selecting a set of values used to generate the first set of OFDM symbols, or the second set of OFDM symbols, or a combination thereof, based on an aggregated transmit power metric. In some cases, the selected set of values minimize a variance of the aggregated transmit power metric across the set of antennas.

OOK modulator 850 may modulate to the cyclically-shifted OFDM waveform using on-off keying. OOK modulator 850 may modulate the first set of OFDM symbols using on-off keying to generate a first modulated wakeup signal for the first antenna. OOK modulator 850 may modulate the second set of OFDM symbols using the on-off keying to generate a second modulated wakeup signal for the second antenna.

Symbol divider 855 may divide each of the OFDM symbols of the set of OFDM symbols into a set of segments.

Phase rotation manager 860 may apply, for each of the set of antennas, a different set of phase rotations to the set of segments to generate a set of phase-rotated wakeup signals corresponding to the wakeup radio frame.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
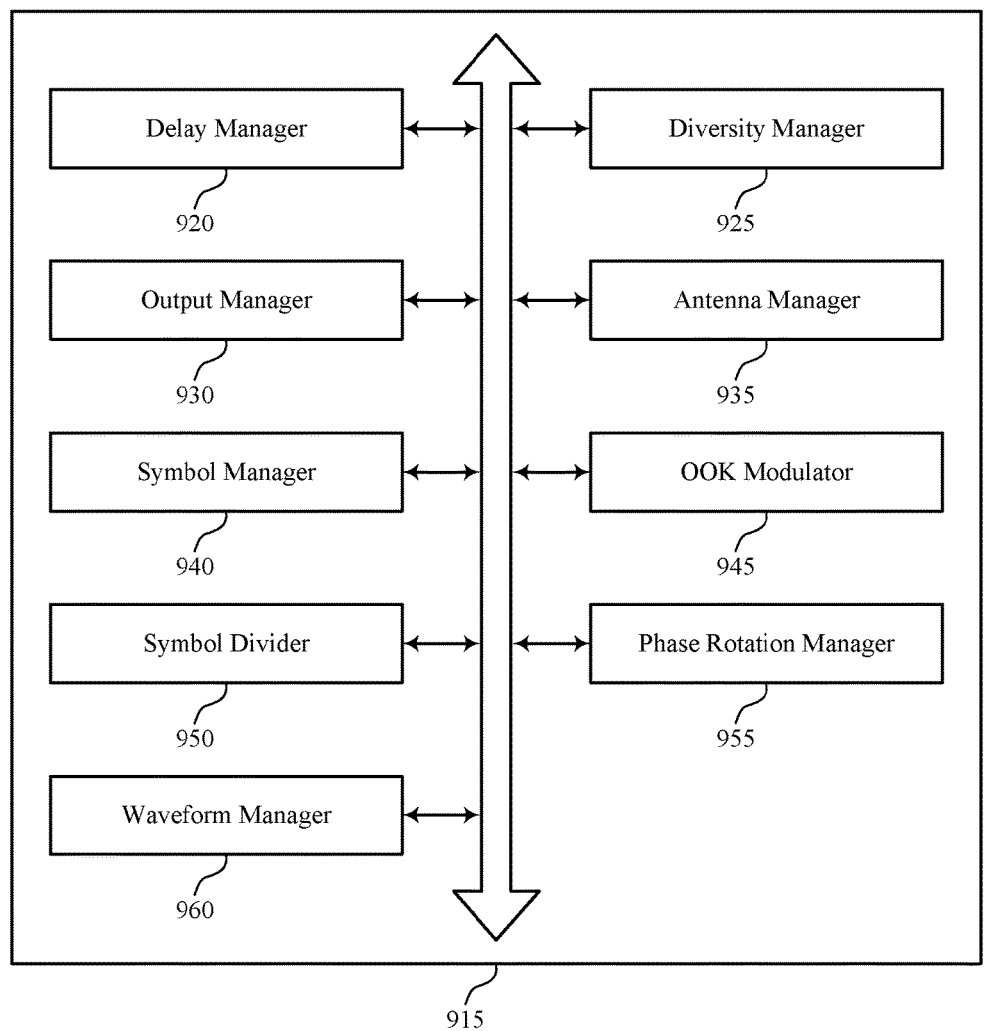

FIG. 9 shows a block diagram 900 of a communications manager 915 that supports wakeup radio transmit diversity in accordance with aspects of the present disclosure. The communications manager 915 may be an example of aspects of a communications manager 715, a communications manager 815, or a communications manager 1015 described with reference to FIGS. 7, 8, and 10. The communications manager 915 may include delay manager 920, diversity manager 925, output manager 930, antenna manager 935, symbol manager 940, OOK modulator 945, symbol divider 950, phase rotation manager 955, and waveform manager 960. Each of these modules may communicate, directly or indirectly, with one another (e.g., via one or more buses).

Delay manager 920 may identify, for a first portion of a wakeup radio frame, a first set of cyclic delay values corresponding to a set of antennas of the first wireless device. Delay manager 920 may identify the first set of cyclic delay values based on a first bandwidth for the first portion of the wakeup radio frame. Delay manager 920 may identify the second set of cyclic delay values based on a second bandwidth for the second portion of the wakeup radio frame. In some cases, cyclic delay values of the first set of cyclic delay values corresponding to the set of antennas are equal to or less than cyclic delay values of the second set of cyclic delay values corresponding to the set of antennas. Delay manager 920 may identify the first set of cyclic delay values based on a first data rate for the first portion of the wakeup radio frame. Delay manager 920 may identify, for a second portion of the wakeup radio frame, a second set of cyclic delay values corresponding to the set of antennas. In some cases, cyclic delay values of the first set of cyclic delay values corresponding to the set of antennas are equal to or greater than cyclic delay values of the second set of cyclic delay values corresponding to the set of antennas.

Delay manager 920 may identify the second set of cyclic delay values based on a second data rate for the second portion of the wakeup radio frame. In some cases, a synchronization field and a data field having a second bandwidth smaller than the first bandwidth. In some cases, the first bandwidth is larger than the second bandwidth. In some cases, the first data rate is greater than the second data rate. In some cases, the first portion of the wakeup radio frame includes at least a synchronization field of the wakeup radio frame. In some cases, the second portion of the wakeup radio frame includes at least a data field of the wakeup radio frame. In some cases, the wakeup radio frame includes a L-STF, a L-LTF, a L-SIG, and a binary phase shift keying (BPSK)-Mark field having a first bandwidth.

Diversity manager 925 may apply the first set of cyclic delay values to symbols of the first portion of the wakeup radio frame for the set of antennas and the second set of cyclic delay values to symbols of the second portion of the wakeup radio frame for the set of antennas to generate cyclically-shifted wakeup signals for the set of antennas. Diversity manager 925 may apply the second set of cyclic delay values to at least a portion of each of the set of OFDM symbols. Diversity manager 925 may apply the second set of cyclic delay values to the OFDM waveform for the set of antennas to generate a cyclically-shifted OFDM waveform. In some cases, applying the second set of cyclic delay values to the second portion of the wakeup radio frame includes generating a set of OFDM symbols including the second portion.

Output manager 930 may transmit the cyclically-shifted wakeup signals to a second wireless device using the set of antennas. Output manager 930 may transmit the first modulated wakeup signal using the first antenna and the second modulated wakeup signal using the second antenna. Output manager 930 may transmit the set of phase-rotated wakeup signals using the set of antennas.

Antenna manager 935 may identify a set of antennas to be used to transmit a wakeup radio frame to a second wireless device.

Symbol manager 940 may generate, for at least a portion of the wakeup radio frame, a first set of OFDM symbols to be transmitted using a first antenna of the set of antennas, and a second set of OFDM symbols to be transmitted using a second antenna of the set of antennas. Symbol manager 940 may generate, for at least a portion of the wakeup radio frame, a set of OFDM symbols to be transmitted by the set of antennas. In some cases, applying the second set of cyclic delay values to the second portion of the wakeup radio frame includes generating a set of OFDM symbols including the second portion. In some cases, at least one of the first set of OFDM symbols is different from a corresponding at least one of the second set of OFDM symbols. In some cases, generating the first set of OFDM symbols and the second set of OFDM symbols, includes selecting a set of values used to generate the first set of OFDM symbols, or the second set of OFDM symbols, or a combination thereof, based on an aggregated transmit power metric. In some cases, the selected set of values minimize a variance of the aggregated transmit power metric across the set of antennas.

OOK modulator 945 may modulate to the cyclically-shifted OFDM waveform using on-off keying. OOK modulator 945 may modulate the first set of OFDM symbols using on-off keying to generate a first modulated wakeup signal for the first antenna. OOK modulator 945 may modulate the second set of OFDM symbols using the on-off keying to generate a second modulated wakeup signal for the second antenna.

Symbol divider 950 may divide each of the OFDM symbols of the set of OFDM symbols into a set of segments.

Phase rotation manager 955 may apply, for each of the set of antennas, a different set of phase rotations to the set of segments to generate a set of phase-rotated wakeup signals corresponding to the wakeup radio frame.

Waveform manager 960 may generate an OFDM waveform for a duration of the second portion of the wakeup radio frame based on the generated set of OFDM symbols.

Figure 10:
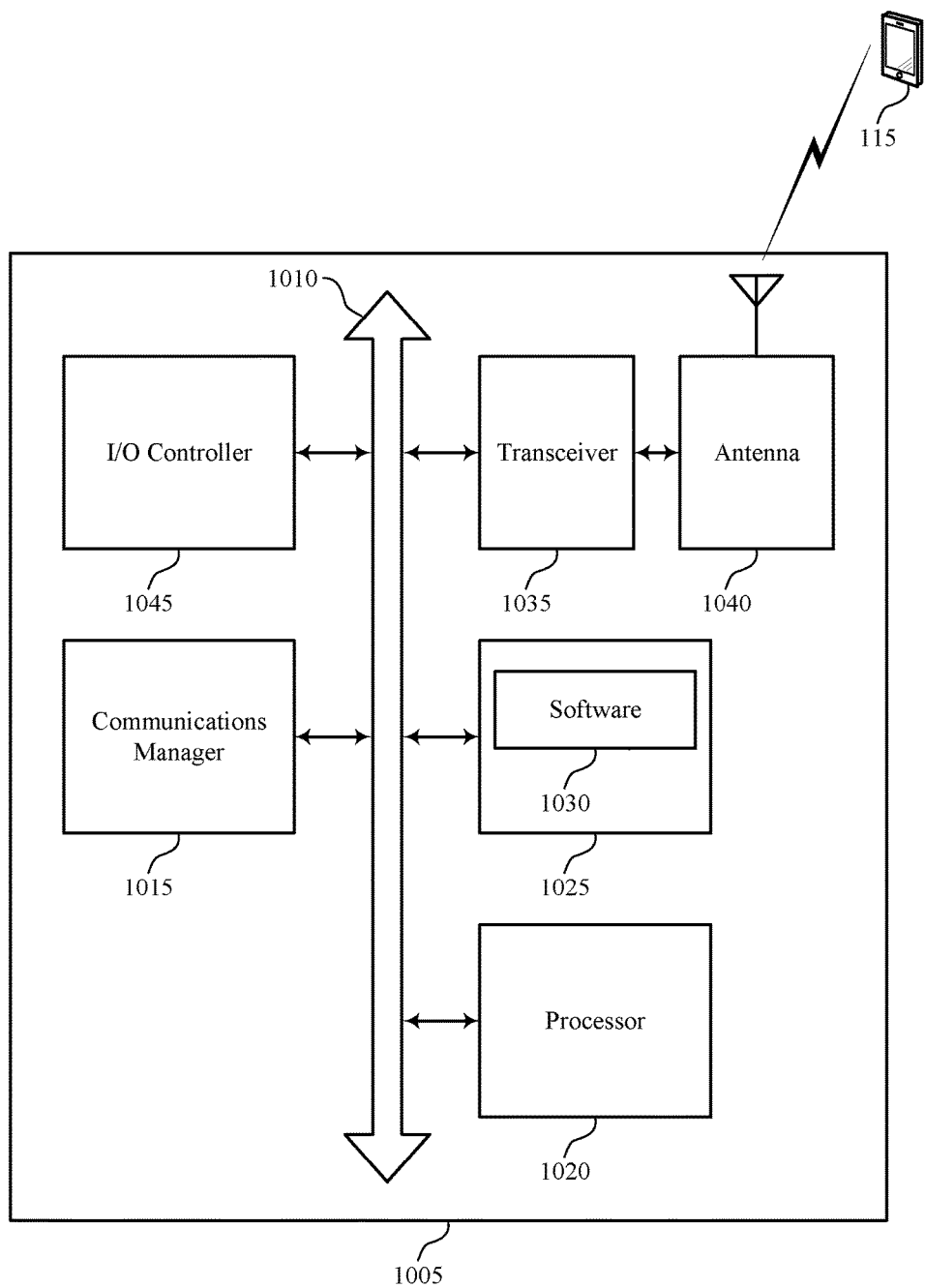
FIG. 10 illustrates a block diagram of a system including a wireless device that supports wakeup radio transmit diversity in accordance with aspects of the present disclosure.

FIG. 10 shows a diagram of a system 1000 including a device 1005 that supports wakeup radio transmit diversity in accordance with aspects of the present disclosure. Device 1005 may be an example of or include the components of wireless device 705 or wireless device 805 as described above, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting wakeup radio transmit diversity).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support wakeup radio transmit diversity. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
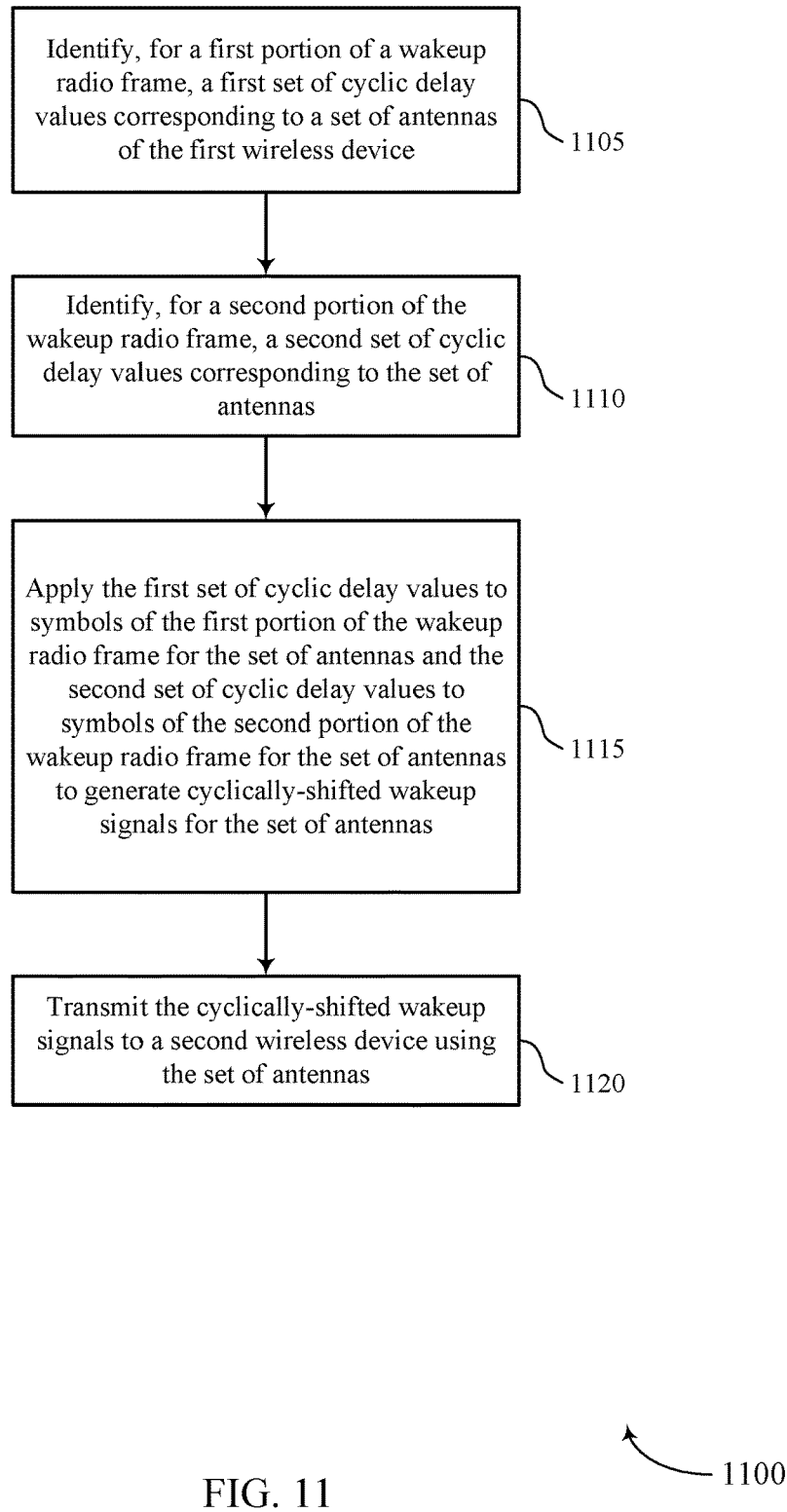
FIGS. 11 through 13 illustrate methods for wakeup radio transmit diversity in accordance with aspects of the present disclosure.

FIG. 11 shows a flowchart illustrating a method 1100 for wakeup radio transmit diversity in accordance with aspects of the present disclosure. The operations of method 1100 may be implemented by a wireless device or its components as described herein. For example, the operations of method 1100 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1105 the wireless device may identify, for a first portion of a wakeup radio frame, a first set of cyclic delay values corresponding to a plurality of antennas of the first wireless device. The operations of 1105 may be performed according to the methods described herein. In certain examples, aspects of the operations of 1105 may be performed by a delay manager as described with reference to FIGS. 7 through 10.

At 1110 the wireless device may identify, for a second portion of the wakeup radio frame, a second set of cyclic delay values corresponding to the plurality of antennas. The operations of 1110 may be performed according to the methods described herein. In certain examples, aspects of the operations of 1110 may be performed by a delay manager as described with reference to FIGS. 7 through 10.

At 1115 the wireless device may apply the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas. The operations of 1115 may be performed according to the methods described herein. In certain examples, aspects of the operations of 1115 may be performed by a diversity manager as described with reference to FIGS. 7 through 10.

At 1120 the wireless device may transmit the cyclically-shifted wakeup signals to a second wireless device using the plurality of antennas. The operations of 1120 may be performed according to the methods described herein. In certain examples, aspects of the operations of 1120 may be performed by a output manager as described with reference to FIGS. 7 through 10.

Figure 12:
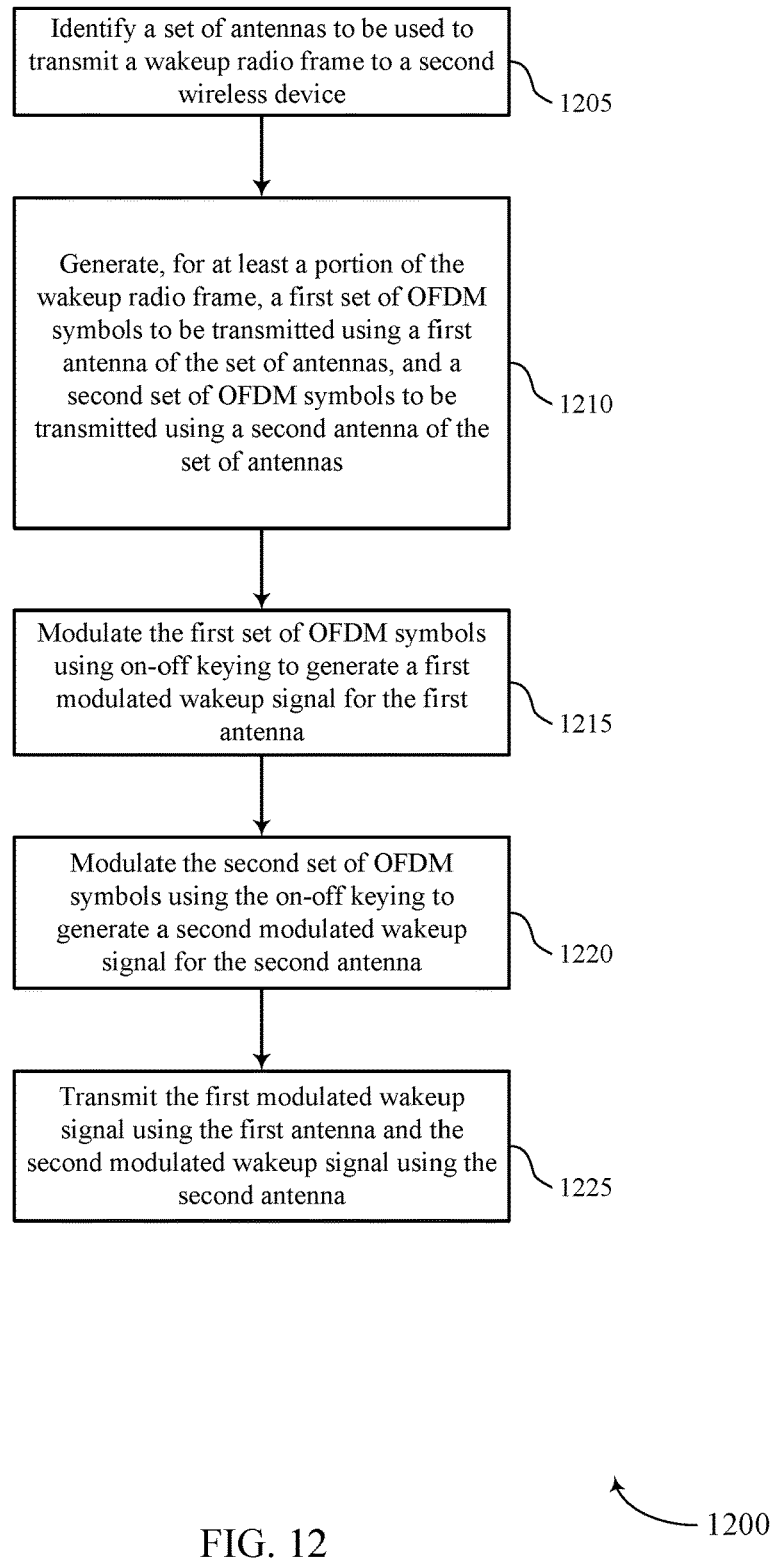

FIG. 12 shows a flowchart illustrating a method 1200 for wakeup radio transmit diversity in accordance with aspects of the present disclosure. The operations of method 1200 may be implemented by a wireless device or its components as described herein. For example, the operations of method 1200 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1205 the wireless device may identify a plurality of antennas to be used to transmit a wakeup radio frame to a second wireless device. The operations of 1205 may be performed according to the methods described herein. In certain examples, aspects of the operations of 1205 may be performed by an antenna manager as described with reference to FIGS. 7 through 10.

At 1210 the wireless device may generate, for at least a portion of the wakeup radio frame, a first set of OFDM symbols to be transmitted using a first antenna of the plurality of antennas, and a second set of OFDM symbols to be transmitted using a second antenna of the plurality of antennas. The operations of 1210 may be performed according to the methods described herein. In certain examples, aspects of the operations of 1210 may be performed by a symbol manager as described with reference to FIGS. 7 through 10.

At 1215 the wireless device may modulate the first set of OFDM symbols using on-off keying to generate a first modulated wakeup signal for the first antenna. The operations of 1215 may be performed according to the methods described herein. In certain examples, aspects of the operations of 1215 may be performed by a OOK modulator as described with reference to FIGS. 7 through 10.

At 1220 the wireless device may modulate the second set of OFDM symbols using the on-off keying to generate a second modulated wakeup signal for the second antenna. The operations of 1220 may be performed according to the methods described herein. In certain examples, aspects of the operations of 1220 may be performed by a OOK modulator as described with reference to FIGS. 7 through 10.

At 1225 the wireless device may transmit the first modulated wakeup signal using the first antenna and the second modulated wakeup signal using the second antenna. The operations of 1225 may be performed according to the methods described herein. In certain examples, aspects of the operations of 1225 may be performed by a output manager as described with reference to FIGS. 7 through 10.

Figure 13:
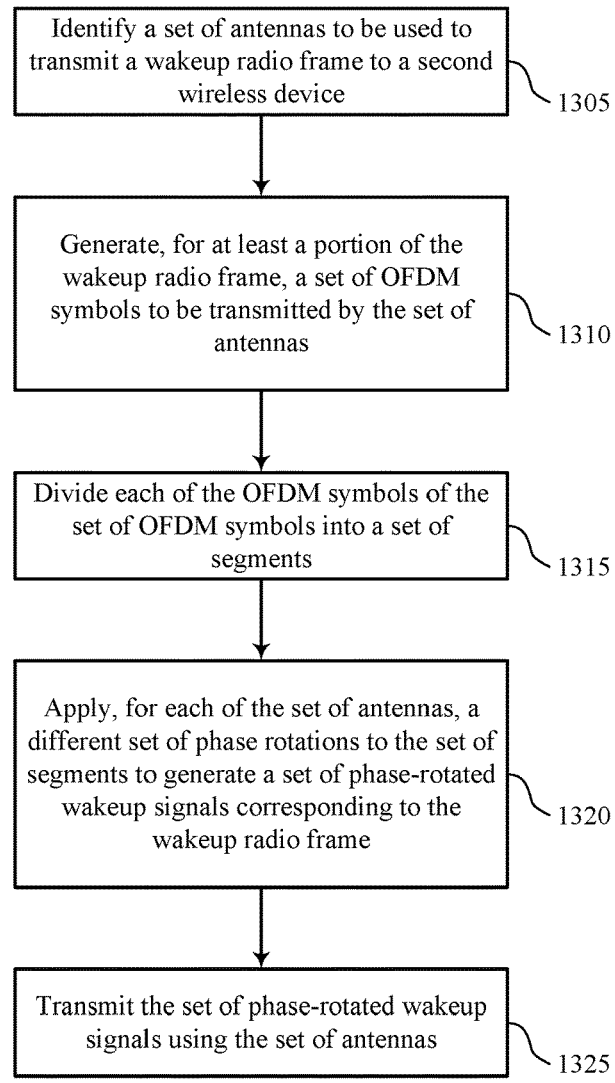

FIG. 13 shows a flowchart illustrating a method 1300 for wakeup radio transmit diversity in accordance with aspects of the present disclosure. The operations of method 1300 may be implemented by a wireless device or its components as described herein. For example, the operations of method 1300 may be performed by a communications manager as described with reference to FIGS. 7 through 10. In some examples, a wireless device may execute a set of codes to control the functional elements of the device to perform the functions described below. Additionally or alternatively, the wireless device may perform aspects of the functions described below using special-purpose hardware.

At 1305 the wireless device may identify a plurality of antennas to be used to transmit a wakeup radio frame to a second wireless device. The operations of 1305 may be performed according to the methods described herein. In certain examples, aspects of the operations of 1305 may be performed by an antenna manager as described with reference to FIGS. 7 through 10.

At 1310 the wireless device may generate, for at least a portion of the wakeup radio frame, a set of OFDM symbols to be transmitted by the plurality of antennas. The operations of 1310 may be performed according to the methods described herein. In certain examples, aspects of the operations of 1310 may be performed by a symbol manager as described with reference to FIGS. 7 through 10.

At 1315 the wireless device may divide each of the OFDM symbols of the set of OFDM symbols into a plurality of segments. The operations of 1315 may be performed according to the methods described herein. In certain examples, aspects of the operations of 1315 may be performed by a symbol divider as described with reference to FIGS. 7 through 10.

At 1320 the wireless device may apply, for each of the plurality of antennas, a different set of phase rotations to the plurality of segments to generate a plurality of phase-rotated wakeup signals corresponding to the wakeup radio frame. The operations of 1320 may be performed according to the methods described herein. In certain examples, aspects of the operations of 1320 may be performed by a phase rotation manager as described with reference to FIGS. 7 through 10.

At 1325 the wireless device may transmit the plurality of phase-rotated wakeup signals using the plurality of antennas. The operations of 1325 may be performed according to the methods described herein. In certain examples, aspects of the operations of 1325 may be performed by a output manager as described with reference to FIGS. 7 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and WLAN 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first wireless device, comprising:
   a processor;
   memory in electronic communication with the processor; and
   instructions stored in the memory and executable by the processor to cause the first wireless device to:
   identify, for a first portion of a wakeup radio frame, a first set of cyclic delay values corresponding to a plurality of antennas of the first wireless device;
   identify, for a second portion of the wakeup radio frame, a second set of cyclic delay values corresponding to the plurality of antennas;
   apply the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas; and transmit the cyclically-shifted wakeup signals to a second wireless device using the plurality of antennas.

2. The first wireless device of claim 1, wherein the instructions are further executable by the processor to cause the first wireless device to:
identify the first set of cyclic delay values based at least in part on a first bandwidth for the first portion of the wakeup radio frame; and
identify the second set of cyclic delay values based at least in part on a second bandwidth for the second portion of the wakeup radio frame.

3. The first wireless device of claim 2, wherein:
the first bandwidth is larger than the second bandwidth; and
cyclic delay values of the first set of cyclic delay values are equal to or less than cyclic delay values of the second set of cyclic delay values.

4. The first wireless device of claim 1, wherein the instructions are further executable by the processor to cause the first wireless device to:
identify the first set of cyclic delay values based at least in part on a first data rate for the first portion of the wakeup radio frame; and
identify the second set of cyclic delay values based at least in part on a second data rate for the second portion of the wakeup radio frame.

5. The first wireless device of claim 4, wherein:
the first data rate is greater than the second data rate; and
cyclic delay values of the first set of cyclic delay values are equal to or greater than cyclic delay values of the second set of cyclic delay values.

6. The first wireless device of claim 1, wherein:
the first portion of the wakeup radio frame comprises at least a synchronization field of the wakeup radio frame; and
the second portion of the wakeup radio frame comprises at least a data field of the wakeup radio frame.

7. The first wireless device of claim 1, wherein the wakeup radio frame comprises:
a legacy short training field (L-STF), a legacy long training field (L-LTF), a legacy signal field (L-SIG), and a binary phase shift keying (BPSK)-Mark field having a first bandwidth; and
a synchronization field and a data field having a second bandwidth smaller than the first bandwidth.

8. The first wireless device of claim 7, wherein a cyclic delay value associated with the synchronization field and a cyclic delay value associated with the data field are equal to each other.

9. The first wireless device of claim 7, wherein a cyclic delay value associated with the synchronization field and a cyclic delay value associated with the data field are different from each other.

10. A method for wireless communication, comprising:
identifying, for a first portion of a wakeup radio frame, a first set of cyclic delay values corresponding to a plurality of antennas of a first wireless device;
identifying, for a second portion of the wakeup radio frame, a second set of cyclic delay values corresponding to the plurality of antennas;
applying the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas; and
transmitting the cyclically-shifted wakeup signals to a second wireless device using the plurality of antennas.

11. The method of claim 10, wherein:
identifying the first set of cyclic delay values comprises identifying the first set of cyclic delay values based at least in part on a first bandwidth for the first portion of the wakeup radio frame; and
identifying the second set of cyclic delay values comprises identifying the second set of cyclic delay values based at least in part on a second bandwidth for the second portion of the wakeup radio frame.

12. The method of claim 11, wherein:
the first bandwidth is larger than the second bandwidth; and
cyclic delay values of the first set of cyclic delay values are equal to or less than cyclic delay values of the second set of cyclic delay values.

13. The method of claim 10, wherein:
identifying the first set of cyclic delay values comprises identifying the first set of cyclic delay values based at least in part on a first data rate for the first portion of the wakeup radio frame; and
identifying the second set of cyclic delay values comprises identifying the second set of cyclic delay values based at least in part on a second data rate for the second portion of the wakeup radio frame.

14. The method of claim 13, wherein:
the first data rate is greater than the second data rate; and
cyclic delay values of the first set of cyclic delay values are equal to or greater than cyclic delay values of the second set of cyclic delay values.

15. The method of claim 10, wherein:
the first portion of the wakeup radio frame comprises at least a synchronization field of the wakeup radio frame; and
the second portion of the wakeup radio frame comprises at least a data field of the wakeup radio frame.

16. The method of claim 10, wherein the wakeup radio frame comprises:
a legacy short training field (L-STF), a legacy long training field (L-LTF), a legacy signal field (L-SIG), and a binary phase shift keying (BPSK)-Mark field having a first bandwidth; and
a synchronization field and a data field having a second bandwidth smaller than the first bandwidth.

17. The method of claim 16, wherein a cyclic delay value associated with the synchronization field and a cyclic delay value associated with the data field are equal to each other.

18. The method of claim 16, wherein a cyclic delay value associated with the synchronization field and a cyclic delay value associated with the data field are different from each other.

19. A first wireless device, comprising:
means for identifying, for a first portion of a wakeup radio frame, a first set of cyclic delay values corresponding to a plurality of antennas of the first wireless device;
means for identifying, for a second portion of the wakeup radio frame, a second set of cyclic delay values corresponding to the plurality of antennas;
means for applying the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas; and means for transmitting the cyclically-shifted wakeup signals to a second wireless device using the plurality of antennas.

20. The first wireless device of claim 19, further comprising:

means for identifying the first set of cyclic delay values based at least in part on a first bandwidth for the first portion of the wakeup radio frame; and means for identifying the second set of cyclic delay values based at least in part on a second bandwidth for the second portion of the wakeup radio frame.

21. The first wireless device of claim 20, wherein:

the first bandwidth is larger than the second bandwidth; and cyclic delay values of the first set of cyclic delay values are equal to or less than cyclic delay values of the second set of cyclic delay values.

22. The first wireless device of claim 19, further comprising:

means for identifying the first set of cyclic delay values based at least in part on a first data rate for the first portion of the wakeup radio frame; and means for identifying the second set of cyclic delay values based at least in part on a second data rate for the second portion of the wakeup radio frame.

23. The first wireless device of claim 22, wherein:

the first data rate is greater than the second data rate; and cyclic delay values of the first set of cyclic delay values are equal to or greater than cyclic delay values of the second set of cyclic delay values.

24. The first wireless device of claim 19, wherein:

the first portion of the wakeup radio frame comprises at least a synchronization field of the wakeup radio frame; and the second portion of the wakeup radio frame comprises at least a data field of the wakeup radio frame.

25. The first wireless device of claim 19, wherein the wakeup radio frame comprises:

a legacy short training field (L-STF), a legacy long training field (L-LTF), a legacy signal field (L-SIG), and a binary phase shift keying (BPSK)-Mark field having a first bandwidth; and a synchronization field and a data field having a second bandwidth smaller than the first bandwidth.

26. The first wireless device of claim 25, wherein a cyclic delay value associated with the synchronization field and a cyclic delay value associated with the data field are equal to each other.

27. The first wireless device of claim 25, wherein a cyclic delay value associated with the synchronization field and a cyclic delay value associated with the data field are different from each other.

28. A non-transitory computer-readable medium storing code for wireless communication, the code comprising instructions executable by a processor to:

identify, for a first portion of a wakeup radio frame, a first set of cyclic delay values corresponding to a plurality of antennas of the first wireless device;

identify, for a second portion of the wakeup radio frame, a second set of cyclic delay values corresponding to the plurality of antennas;

apply the first set of cyclic delay values to symbols of the first portion of the wakeup radio frame for the plurality of antennas and the second set of cyclic delay values to symbols of the second portion of the wakeup radio frame for the plurality of antennas to generate cyclically-shifted wakeup signals for the plurality of antennas; and transmit the cyclically-shifted wakeup signals to a second wireless device using the plurality of antennas.

* * * * *